(12) United States Patent
Kang et al.

(10) Patent No.: US 12,389,428 B2
(45) Date of Patent: Aug. 12, 2025

(54) METHOD AND DEVICE FOR PROCESSING SIDELINK CAPABILITY INFORMATION IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Seungri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 261 days.

(21) Appl. No.: 17/792,247

(22) PCT Filed: Jan. 13, 2021

(86) PCT No.: PCT/KR2021/000469
§ 371 (c)(1),
(2) Date: Jul. 12, 2022

(87) PCT Pub. No.: WO2021/145671
PCT Pub. Date: Jul. 22, 2021

(65) Prior Publication Data
US 2023/0114413 A1    Apr. 13, 2023

(30) Foreign Application Priority Data

Jan. 13, 2020 (KR) .................. 10-2020-0004443
Apr. 21, 2020 (KR) .................. 10-2020-0048280

(51) Int. Cl.
*H04W 72/25*    (2023.01)
*H04W 72/12*    (2023.01)
(Continued)

(52) U.S. Cl.
CPC ....... *H04W 72/25* (2023.01); *H04W 72/1215* (2013.01); *H04W 72/21* (2023.01); *H04W 72/51* (2023.01); *H04W 92/18* (2013.01)

(58) Field of Classification Search
CPC ............................ H04W 92/18; H04L 1/1812
(Continued)

(56) References Cited

U.S. PATENT DOCUMENTS

2018/0077748 A1    3/2018   Kazmi et al.
2019/0013881 A1*   1/2019   Olesen ................ H04B 7/0413
(Continued)

OTHER PUBLICATIONS

OPPO, Left Issues on PC5-RRC Based Capability Transfer Procedure, R2-1912075, 3GPP TSG-RAN WG2 Meeting #107bis, Aug. 26-30, 2019, 6 pages.
(Continued)

*Primary Examiner* — Fabricio R Murillo Garcia
(74) *Attorney, Agent, or Firm* — The Farrell Law Firm, P.C.

(57) ABSTRACT

A user equipment (UE) in a wireless communication system, according to an embodiment of the present disclosure, includes: a transceiver; and at least one processor connected to the transceiver, the at least one processor being configured to: receive, from a base station, a UECapabilityEnquiry message including at least one of radio access technology (RAT) type information or frequency information; and transmit capability information of the UE to the base station based on the RAT type information or the frequency information, wherein the RAT type information is associated with at least one of new radio (NR), evolved universal terrestrial radio access (EUTRA)-NR, or EUTRA, and the frequency information is associated with a Uu frequency or a sidelink frequency.

12 Claims, 19 Drawing Sheets

(51) Int. Cl.
*H04W 72/21* (2023.01)
*H04W 72/51* (2023.01)
*H04W 92/18* (2009.01)

(58) Field of Classification Search
USPC ...................................................... 455/452.1
See application file for complete search history.

(56) References Cited

U.S. PATENT DOCUMENTS

| | | | |
|---|---|---|---|
| 2019/0150031 A1* | 5/2019 | Balasubramanian | .........................  H04W 36/0022 370/329 |
| 2019/0349881 A1 | 11/2019 | Choi et al. | |
| 2020/0092879 A1* | 3/2020 | Wu | ........................ H04W 8/005 |
| 2020/0163005 A1* | 5/2020 | Rao | .......................... H04W 4/44 |
| 2022/0007176 A1* | 1/2022 | Lindheimer | .......... H04L 9/3239 |
| 2022/0022190 A1* | 1/2022 | Lin | ........................ H04W 72/23 |

OTHER PUBLICATIONS

Huawei, "Introduction of Additional Enhancements for NB-IoT", R2-1914094, 3GPP TSG-WG2 Meeting #107bis, Oct. 14-18, 2019, 70 pages.
Lenovo et al., "Corrections to Application Layer Measurement Reporting and UE Capability Signalling", R2-1916310, 3GPP TSG-RAN WG2 Meeting #108, Nov. 18-22, 2019, 82 pages.
Intel Corporation, "[107bis#53][NR LTE MobE] UE Capability Structure DAPS/RUDI HO (Intel)", R2-1914832, 3GPP TSG-RAN WG2 Meeting #108, Nov. 18-22, 2019, 120 pages.
International Search Report dated Apr. 15, 2021 issued in counterpart application No. PCT/KR2021/000469, 15 pages.
Korean Office Action dated Oct. 21, 2024 issued in counterpart application No. 10-2020-0048280, 6 pages.
ZTE Corporation, Sanechips, "Discussion on UE Capability Transfer", R2-1909062, 3GPP TSG RAN WG2 Meeting #107, Aug. 26-30, 2019, 6 pages.
Korean Office Action dated Jun. 26, 2025 issued in counterpart application No. 10-2020-0048280, 8 pages.

* cited by examiner

METHOD AND DEVICE FOR PROCESSING SIDELINK CAPABILITY INFORMATION IN WIRELESS COMMUNICATION SYSTEM

PRIORITY

This application is a National Phase Entry of PCT International Application No. PCT/KR2021/000469, which was filed on Jan. 13, 2021, and claims priority to Korean Patent Application Nos. 10-2020-0004443 and 10-2020-0048280, which were filed on Jan. 13, 2020 and Apr. 21, 2020, respectively, the entire content of each of which is incorporated herein by reference.

TECHNICAL HELD

The present disclosure relates to a wireless communication system, and more particularly, to a method and device for processing sidelink capability information of a terminal in a wireless communication system.

BACKGROUND ART

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multiple input multiple output (MIMO), full dimensional MIMO (FD-MIMO), array antenna, analog beamforming, and large-scale antenna system, are being discussed.

Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points points (CoMP), and received-interference cancellation, are being developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank mufti-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

Also, terminal-to-terminal direct communication (sidelink communication) using a 5G communication system is being studied. It is expected that the terminal-to-terminal direct communication is applied to, for example, vehicle-to-everything (hereinafter referred to as "V2X") to provide various services to users.

DESCRIPTION OF EMBODIMENTS

Technical Problem

The present disclosure provides a method and device for processing sidelink capability information of a terminal in a wireless communication system.

In addition, the present disclosure provides a method and device for obtaining sidelink capability information of a terminal performing sidelink unicast-based, sidelink groupcast-based, or sidelink broadcast-based transmission and reception in a wireless communication system.

Solution to Problem

A user equipment (UE) in a wireless communication system, according to an embodiment of the present disclosure, includes: a transceiver; and at least one processor connected to the transceiver, the at least one processor being configured to: receive, from a base station, a UECapabilityEnquiry message including at least one of radio access technology (RAT) type information or frequency information; and transmit capability information of the UE to the base station based on the RAT type information or the frequency information, wherein the RAT type information is associated with at least one of new radio (NR), evolved universal terrestrial radio access (EUTRA)-NR, or EUTRA, and the frequency information is associated with a Uu frequency or a sidelink frequency.

The capability information of the UE may include sidelink radio capability information, and the sidelink radio capability information may include at least one of a list of bands supporting a sidelink, a band combination supporting the sidelink, or a band combination for frequencies supporting a sidelink among Uu frequencies.

The capability information of the UE may include sidelink radio capability information, and the sidelink radio capability information may include a radio link control (RLC) feature, a medium access control (MAC) feature, or a physical (PHY) feature.

The capability information of the UE may include information about a list of bands or a band combination corresponding to at least one of EUTRA or NR.

A first user equipment (UE) in a wireless communication system, according to an embodiment of the present disclosure, includes: a transceiver; and at least one processor connected to the transceiver, the at least one processor being configured to: receive, from a second UE, a UECapabilityEnquiry message including sidelink frequency filter information; and transmit capability information of the first UE to the second UE based on the sidelink frequency filter information.

The capability information of the first UE may include sidelink frequency information corresponding to the sidelink frequency filter information.

The sidelink frequency information may include at least one of a list of bands or a band combination supported by the first UE.

The capability information of the first UE may be associated with unicast sidelink communication.

Sidelink UE capability information may be configured by the second UE based on the capability information of the first UE.

The sidelink UE capability information may be transmitted to the base station by the second UE.

The sidelink UE capability information may include the capability information of the first UE.

An operating method of a first user equipment (UE) in a wireless communication system, according to an embodiment of the present disclosure, includes: receiving, from a second UE, a UECapabilityEnquiry message including sidelink frequency filter information; and transmitting capability information of the first UE based on the sidelink frequency filter information, wherein the capability information of the first UE includes sidelink frequency information corresponding to the sidelink frequency filter information.

A base station in a wireless communication system, according to an embodiment of the present disclosure, includes: a transceiver; and at least one processor connected to the transceiver, the at least one processor being configured to: transmit, to a user equipment (UE), a UECapabilityEnquiry message including at least one of radio access technology (RAT) type information or frequency information; and receive, from the UE, capability information of the UE generated based on the RAT type information or the frequency information, wherein the RAT type information is associated with at least one of new radio (NR), evolved universal terrestrial radio access (EUTRA)-NR, or EUTRA, and the frequency information is associated with a Uu frequency or a sidelink frequency.

MODE OF DISCLOSURE

Figure 1:
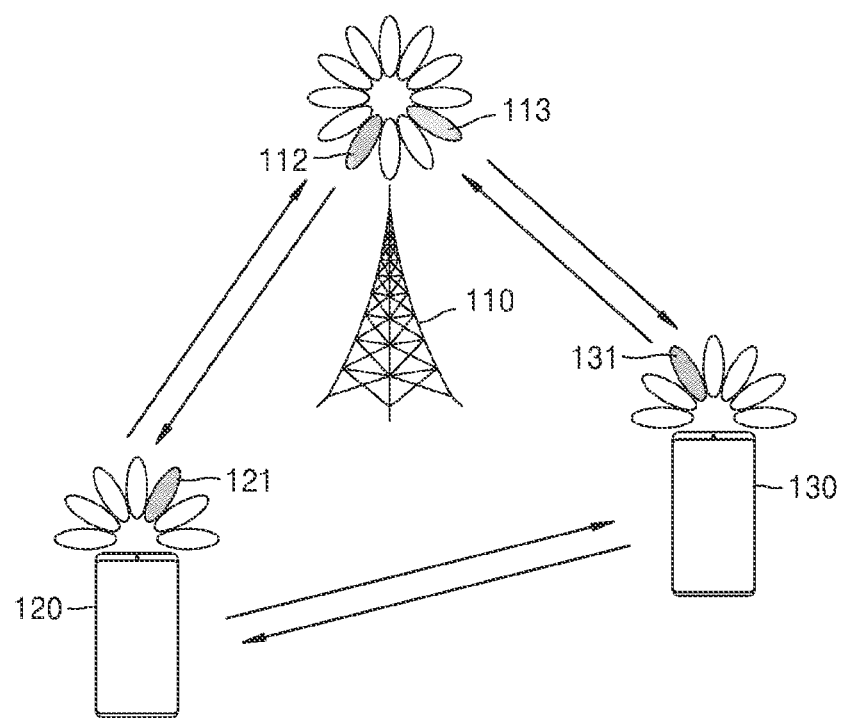
FIG. 1 illustrates a wireless communication system according to an embodiment of the present disclosure.

Hereinafter, preferred embodiments of the present disclosure will be described in detail with reference to the accompanying drawings. It should be noted that the same elements are denoted by the same reference numerals as much as possible in the accompanying drawings. Also, detailed descriptions of well-known functions and configurations that may obscure the gist of the present disclosure may be omitted herein.

In describing embodiments of the present disclosure, descriptions of technical contents that are well known in the technical field to which the present disclosure pertains and are not directly related to the present disclosure will be omitted herein. By omitting unnecessary descriptions, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Advantages and features of the present disclosure, and methods of achieving them will be clarified with reference to embodiments described below in detail with reference to the accompanying drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term " . . . er/or" as used herein refers to a software element or a hardware element such as field programmable gate array (FPGA) or application specific integrated circuit (ASIC), and the " . . . er/or" performs certain functions. However, the term " . . . er/or" is not limited to software or hardware. The term " . . . er/or" may be configured in an addressable storage medium or may be configured to reproduce one or more processors. Therefore, for example, the term " . . . er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the " . . . er/or" may be combined with fewer elements and " . . . er/or" or may be separated from additional elements and " . . . er/or" Furthermore, the elements and the " . . . er/or" may be implemented to reproduce one or more central processing units (CPUs) in the device or secure multimedia card.

In describing embodiments of the present disclosure in detail, the main focus is new RAN (new radio (NR)), which is a radio access network based on a $5^{th}$ generation (5G) mobile communication standard, and a packet core (5G system, 5G core network, or next generation (NG) core), which is a core network, the NR and the packet core being specified by $3^{rd}$ generation partnership project (3GPP), which is a mobile communication standardization organization. However, the main gist of the present disclosure is applicable to other communication systems having a similar technical background with slight modifications without significantly departing from the scope of the present disclosure. This will be possible by the determination of those of ordinary skill in the art.

In the 5G system, in order to support network automation, a network data collection and analysis function (NWDAF), which is a network function of analyzing and providing data collected from a 5G network, may be defined. The NWDAF may collect, store, and analyze information from the 5G network and provide results thereof to unspecified network functions (NFs), and a result of the analyzing may be used independently by each NF.

For convenience of description, some terms and names defined in the 3GPP standard (standards of 5G, NR, long term evolution (LTE), or systems similar thereto) may be used. However, the present disclosure is not limited by the terms and names and may be equally applied to systems conforming to other standards.

Hereinafter, the present disclosure relates to a method and device for processing sidelink capability information in a wireless communication system. Specifically, the present disclosure relates to a method and device for processing sidelink capability information between a terminal and a base station and between a terminal and a terminal in order to support sidelink communication between a terminal and a terminal, and relates to a method and device for processing various Uu radio access technology (RAT) types and various sidelink RAT type filtering supported by a terminal. In the present disclosure, sidelink capability information may include at least one of a Uu frequency, a sidelink frequency, a Uu RAT type, a sidelink RAT type, a sidelink service data adaptation protocol (SDAP) layer feature set, a sidelink packet data convergence protocol (PDCP) layer feature set, a sidelink radio link control (RLC) layer feature set, a sidelink media access control (MAC) layer feature set, and a sidelink physical layer feature set, which are supported by a terminal. According to embodiments of the present disclosure, a terminal may effectively provide various radio functions (features or functions) according to terminal capability information in order to perform direct communication between terminals or perform communication with a base station through various radio interfaces (NR radio or evolved universal terrestrial radio access (SUTRA) radio).

The terms referring to signals, the terms referring to channels, the terms referring to control information, the terms referring to network entities, the terms referring to elements of devices, and the like are exemplified for convenience of description. Therefore, the present disclosure is not limited to the terms to be described later, and other terms referring to entities having an equivalent technical meaning may be used.

In the following description, a physical channel and a signal may be used interchangeably with data or a control signal. For example, although a physical downlink shared channel (PDSCH) is a term that refers to a physical channel on which data is transmitted, the PDSCH may also be used to refer to data. That is, in the present disclosure, the expression "a physical channel is transmitted" may be interpreted equivalently to the expression "data or a signal is transmitted on a physical channel."

Hereinafter, in the present disclosure, higher layer signaling refers to a signal transmission method of transmitting a signal from a base station to a terminal by using a downlink data channel of a physical layer, or transmitting a signal from a terminal to a base station by using an uplink data channel of a physical layer. Higher layer signaling may be understood as radio resource control (RRC) signaling or MAC control element (CE).

Also, in the present disclosure, the expression "greater than or less than" is used to determine whether a particular condition is satisfied or fulfilled, but this is only a description for expressing an example and does not exclude a description "equal to or greater than, or equal to or less than." A conditions described as "equal to or greater than" may be replaced with "greater than," a conditions described as "equal to or less than" may be replaced with "less than," and a condition described as "equal to or greater than, and less than" may be replaced with "greater than, and equal to or less than."

Also, in the present disclosure, embodiments are described with the terms used in some communication standards (e.g., 3GPP), but this is only an example for description. Embodiments of the present disclosure may also be easily modified and applied to other communication systems.

Hereinafter, sidelink capability information may be referred to as sidelink radio capability information, which means capability information for a terminal to perform sidelink communication.

FIG. 1 illustrates a wireless communication system according to embodiments of the present disclosure.

In FIG. 1, a base station 110, a terminal 120, and a terminal 130 are illustrated as examples of nodes using a radio channel in the wireless communication system. Although FIG. 1 illustrates only one base station, other base stations that are the same as or similar to the base station 110 may be further included.

The base station 110 is a network infrastructure that provides radio access to the terminals 120 and 130. The base station 110 has a coverage defined as a certain geographic area based on a distance within which a signal is transmittable. The base station 110 may be referred to as, in addition to the base station, an "access point (AP)," an "eNodeB (eNB)," a "5G node," a "next generation nodeB (gNB)," a "wireless point," a "transmission/reception point (TRP)," or other terms having a technical meaning equivalent thereto.

Each of the terminal 120 and the terminal 130 is a device that is used by a user, and performs communication with the base station 110 through a radio channel. A link from the base station 110 to the terminal 120 or the terminal 130 is referred to as downlink (DL), and a link from the terminal 120 or the terminal 130 to the base station 110 is referred to as uplink (UL). Also, the terminal 120 and the terminal 130 may perform communication with each other through a radio channel. In this case, a link between the terminal 120 and the terminal 130 is referred to as a sidelink, and the sidelink may also be referred to as a PC5 interface. In some cases, at least one of the terminal 120 and the terminal 130 may operate without a user's involvement. That is, at least one of the terminal 120 and the terminal 130 is a device that performs machine type communication (MTC) and may not be carried by a user. Each of the terminal 120 and the terminal 130 may be referred to as, in addition to the terminal, a "user equipment (UE)," a "mobile station," a "subscriber station," a "remote terminal," a "wireless terminal," a "user device," or other terms having a technical meaning equivalent thereto.

The base station 110, the terminal 120, and the terminal 130 may transmit and receive radio signals in millimeter wave (mmWave) bands (e.g., 28 GHz, 30 GHz, 38 GHz. or 60 GHz). In this case, the base station 110, the terminal 120, and the terminal 130 may perform beamforming in order to improve a channel gain. The beamforming may include transmit beamforming and receive beamforming. That is, the base station 110, the terminal 120, and the terminal 130 may impart directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed using resources having a quasi co-located (QCL) relationship with resources on which the serving beams 112, 113, 121, and 131 are transmitted.

When large-scale properties of a channel on a first antenna port, the channel carrying a symbol, may be inferred from a channel on a second antenna port, the channel carrying a symbol, the first antenna port and the second antenna port may be evaluated to be in a QCL relationship. For example, the large-scale properties may include at least one of delay spread, Doppler spread, Doppler shift, average gain, average delay, or spatial receiver parameter.

The terminal 120 and the terminal 120 illustrated in FIG. 1 may support vehicle-to-everything (V2X) communication. In the case of the V2X, standardization work for V2X technology based on a device-to-device (D2D) communication structure in a LTE system has been completed in the 3GPP Release 14 and Release 15, and efforts are currently being made to develop V2X technology based on 5G NR. In NR V2X, it is planned to support unicast communication, groupcast (or multicast) communication, and broadcast communication between terminals. Unlike LTE V2X, which aims to transmit and receive basic safety information necessary for vehicle road driving. NR V2X aims to provide more advanced services, such as platooning, advanced driving, extended sensor, and remote driving.

V2X services may be classified into basic safety services and advanced services. The basic safety services may include a vehicle notification (cooperative awareness messages (CAM) or basic safety message (BSM) service and detailed services, such as a left turn notification service, a front-vehicle collision warning service, an emergency vehicle approach notification service, a forward obstacle warning service, and an intersection signal information service. V2X information may be transmitted and received by using a broadcast, unicast, or groupcast transmission method. The advanced services have strengthened quality of service (QoS) requirements, compared to the basic safety services, and require a method of transmitting and receiving V2X information by using unicast and groupcast transmission methods as well as a broadcast transmission method in order to transmit and receive V2X information within a particular vehicle group or to transmit and receive V2X information between two vehicles. The advanced services may include detailed services, such as a platooning service, an autonomous driving service, a remote driving service, and an extended sensor-based V2X service.

Hereinafter, a sidelink (SL) refers to a signal transmission/reception path between a terminal and a terminal, and the SL may be used interchangeably with a PC5 interface. Hereinafter, a base station is a subject that allocates resources of a terminal, and may be a base station that supports both V2X communication and general cellular communication, or a base station that supports only V2X communication. That is, the base station may refer to an NR base station (e.g., gNB), an LTE base station (e.g., eNB), or a road site unit (RSU). The terminal may include a general UE, a mobile station, a vehicle that supports vehicular-to-vehicular (V2V) communication, a vehicle that supports vehicular-to-pedestrian (V2P) communication, a pedestrian's handset (e.g., a smartphone), a vehicle that supports vehicular-to-network (V2N) communication, a vehicle that supports vehicular-to-infrastructure (V2I) communication, a RSU having a terminal function, a RSU having a base station function, or a RSU having a part of a base station function and a part of a terminal function. Also, the V2X terminal as used herein may be referred to as a terminal. That is, in relation to V2X communication, the terminal may be used as a V2X terminal.

The base station and the terminal are connected to each other through a Uu interface. A UL refers to a radio link through which the terminal transmits data or a control signal to the base station, and a DL refers to a radio link through which the base station transmits data or a control signal to the terminal.

Figure 2:
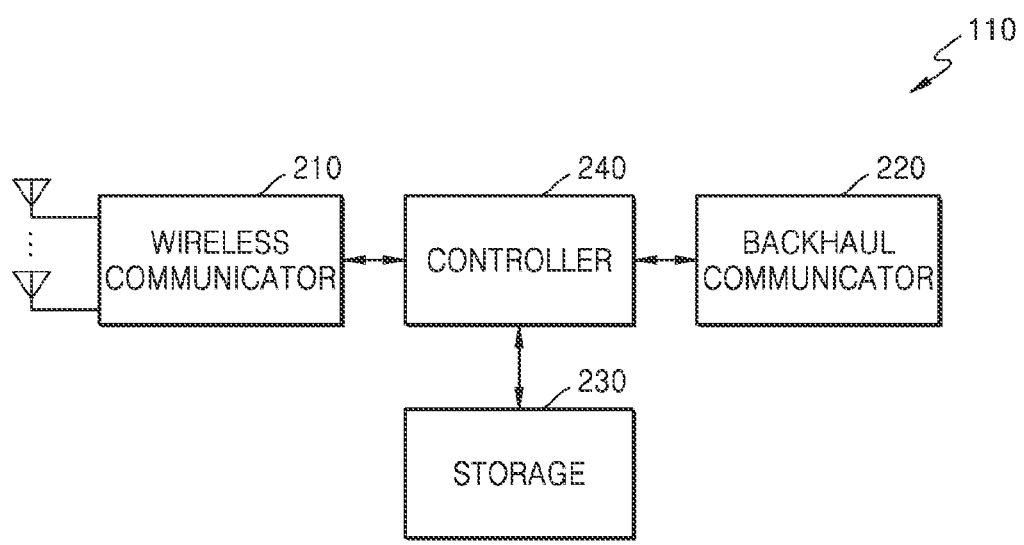
FIG. 2 illustrates a structure of a base station in a wireless communication system, according to an embodiment of the present disclosure.

FIG. 2 illustrates a structure of a base station in a wireless communication system, according to an embodiment of the present disclosure. The structure illustrated in FIG. 2 may be understood as the structure of the base station 110. The terms " . . . er/or" and "module" as used herein mean units that process at least one function or operation, and may be implemented as hardware, software, or a combination of hardware and software.

Referring to FIG. 2, the base station 110 includes a wireless communicator 210, a backhaul communicator 220, a storage 230, and a controller 240.

The wireless communicator 210 performs functions for transmitting and receiving signals through a radio channel. For example, the wireless communicator 210 performs a conversion function between a baseband signal and a bit string according to a physical layer standard of a system. For example, upon transmission of data, the wireless communicator 210 encodes and modulates a transmission bit string to generate complex symbols. Also, upon reception of data, the wireless communicator 210 demodulates and decodes a baseband signal to reconstruct a reception bit string.

Also, the wireless communicator 210 up-converts the baseband signal into a radio frequency (RF) band signal, transmits the RF band signal through an antenna, and down-converts the RF band signal received through the antenna into the baseband signal. To this end, the wireless communicator 210 may include a transmission filter, a reception filter, an amplifier, a mixer, an oscillator, a digital-to-analog converter (DAC), an analog-to-digital converter (ADC), and the like. Also, the wireless communicator 210 may include a plurality of transmission/reception paths. Furthermore, the wireless communicator 210 may include at least one antenna array including a plurality of antenna elements.

In terms of hardware, the wireless communicator 210 may include a digital unit and an analog unit. The analog unit may include a plurality of sub-units according to operating power, an operating frequency, and the like. The digital unit may be implemented as at least one processor (e.g., a digital signal processor (DSP)).

The wireless communicator 210 transmits and receives signals, as described above. Accordingly, all or part of the wireless communicator 210 may be referred to as a "transmitter," a "receiver," or a "transceiver." Also, in the following description, the transmission and reception performed through the radio channel are used in the meaning of including processing performed as described above by the wireless communicator 210.

The backhaul communicator 220 provides an interface for performing communication with other nodes in the network. That is, the backhaul communicator 220 converts a bit string, which is transmitted from the base station 110 to another node, for example, another access node, another base station, an upper node, a core network, etc. into a physical signal, and converts a physical signal, which is received from another node, into a bit string.

The storage 230 stores data such as configuration information, basic programs, and application programs for operations of the base station 110. The storage 230 may include a volatile memory, a non-volatile memory, or a combination of a volatile memory and a non-volatile memory. The storage 230 provides the stored data in response to the request of the controller 240.

The controller 240 controls overall operations of the base station 110. For example, the controller 240 transmits and receives signals through the wireless communicator 210 or the backhaul communicator 220. Also, the controller 240 may record data in the storage 230 and read data from the storage 230. The controller 240 may perform functions of a protocol stack required in the communication standards. According to another implementation, the protocol stack may be included in the wireless communicator 210. To this end, the controller 240 may include at least one processor. According to embodiments, the controller 240 may control the base station 110 to perform operations according to embodiments to be described below.

Figure 3:
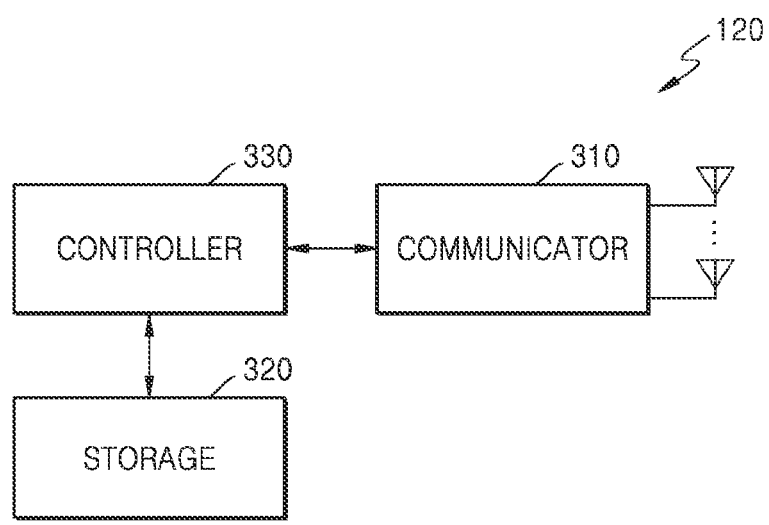
FIG. 3 illustrates a structure of a terminal in a wireless communication system, according to an embodiment of the present disclosure.

FIG. 3 illustrates a structure of a terminal in a wireless communication system, according to an embodiment of the present disclosure.

The structure illustrated in FIG. 3 may be understood as the structure of the terminal 120. The terms " . . . er/or" and "module" as used herein mean units that process at least one function or operation, and may be implemented as hardware, software, or a combination of hardware and software.

Referring to FIG. 3, the terminal 120 includes a communicator 310, a storage 320, and a controller 330.

The communicator 310 performs functions for transmitting and receiving signals on a radio channel. For example, the communicator 310 performs a conversion function between a baseband signal and a bit string according to a physical layer standard of a system. For example, upon transmission of data, the communicator 310 encodes and modulates a transmission bit string to generate complex symbols. Also, upon reception of data, the communicator 310 demodulates and decodes a baseband signal to reconstruct a reception bit string. Also, the communicator 310 up-converts the baseband signal into an RF band signal, transmits the RF band signal through an antenna, and down-converts the RF band signal received through the antenna into the baseband signal. For example, the communicator 310 may include a transmission filter, a reception filter, an amplifier, a mixer, an oscillator, a DAC, an ADC, and the like.

Also, the communicator 310 may include a plurality of transmission/reception paths. Furthermore, the communicator 310 may include at least one antenna array including a plurality of antenna elements. In terms of hardware, the communicator 310 may include a digital circuit and an analog circuit (e.g., a radio frequency integrated circuit (RFIC)). The digital circuit and the analog circuit may be implemented as a single package. Also, the communicator 310 may include a plurality of RF chains. Furthermore, the communicator 310 may perform beamforming.

The communicator 310 transmits and receives signals, as described above. Accordingly, all or part of the communicator 310 may be referred to as a "transmitter," a "receiver," or a "transceiver." Also, in the following description, the transmission and reception performed through the radio channel are used in the meaning of including processing performed as described above by the communicator 310.

The storage 320 stores data such as configuration information, basic programs, and application programs for operations of the terminal 120. The storage 320 may include a volatile memory, a non-volatile memory, or a combination of a volatile memory and a non-volatile memory. The storage 320 provides the stored data in response to the request of the controller 330.

The controller 330 controls overall operations of the terminal 120. For example, the controller 330 transmits and receives signals through the communicator 310. Also, the controller 330 may record data in the storage 320 and read data from the storage 230. The controller 330 may perform functions of a protocol stack required in the communication standards, To this end, the controller 330 may include at least one processor or microprocessor, or may be a part of the processor. Also, a part of the communicator 310 and the controller 330 may be referred to as a communication processor (CP). According to embodiments, the controller 330 may control the terminal 120 to perform operations according to embodiments to be described below.

Figure 4:
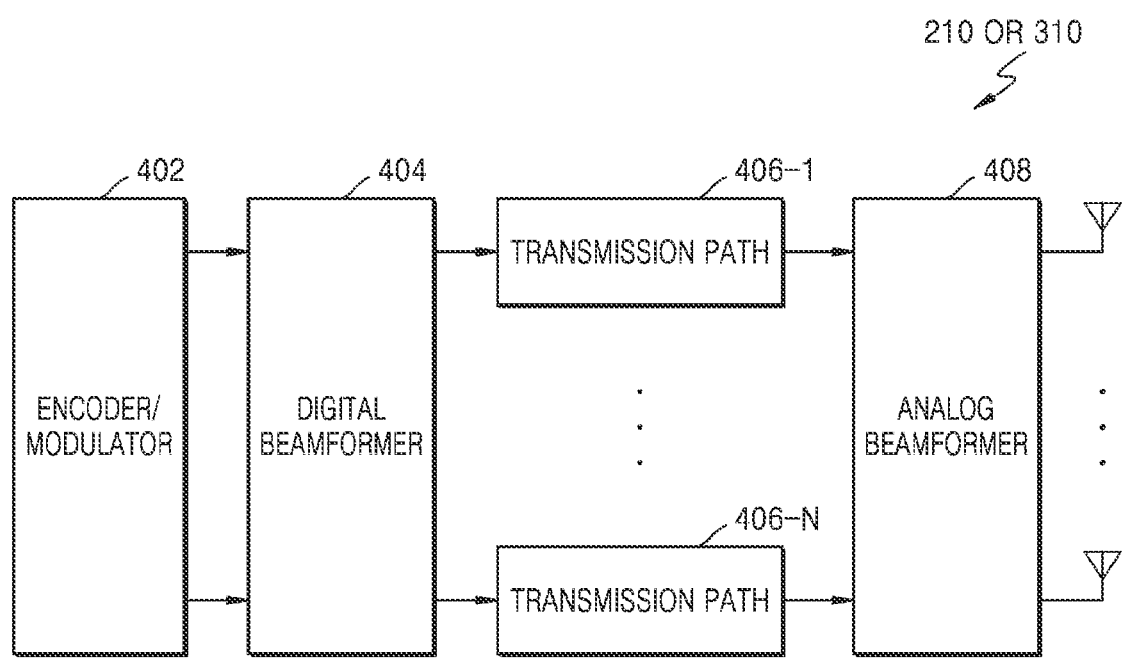
FIG. 4 illustrates a structure of a communicator in a wireless communication system, according to an embodiment of the present disclosure.

FIG. 4 illustrates a structure of a communicator in a wireless communication system, according to an embodiment of the present disclosure.

FIG. 4 illustrates an example of a detailed structure of the wireless communicator 210 of FIG. 2 or the communicator 310 of FIG. 3. Specifically, FIG. 4 illustrates elements for performing beamforming as a part of the wireless communicator 210 of FIG. 2 or the communicator 310 of FIG. 3.

Referring to FIG. 4, the wireless communicator 210 or the communicator 310 includes an encoder/modulator 402, a digital beamformer 404, a plurality of transmission paths 406-1 to 406-N, and an analog beamformer 408.

The encoder/modulator 402 performs channel encoding. For channel encoding, at least one of a low density parity check (LDPC) code, a convolution code, or a polar code may be used. The encoder/modulator 402 performs constellation mapping to generate modulation symbols.

The digital beamformer 404 performs beamforming on a digital signal (e.g., modulation symbols). To this end, the digital beamformer 404 multiplies the modulation symbols by beamforming weights. The beamforming weights are used to change the magnitude and phase of the signal, and may be referred to as a "preceding matrix," a "precoder," or the like. The digital beamformer 404 outputs the digital-beamformed modulation symbols to the transmission paths 406-1 to 406-N. In this case, according to a multiple input multiple output (MIMO) transmission technique, the modulation symbols may be multiplexed, or the same modulation symbols may be provided to the transmission paths 406-1 to 406-N.

The transmission paths 406-1 to 406-N convert digital-beamformed digital signals into an analog signal. To this end, the transmission paths 406-1 to 406-N may each include an inverse fast Fourier transform (IFFT) operator, a cyclic prefix (CP) inserter, a DAC, and an up-converter. The CP inserter is for an orthogonal frequency division multiplexing (OFDM) scheme, and may be excluded when another physical layer scheme (e.g., filter bank multi-carrier (FBMC)) is applied. That is, the transmission paths 406-1 to 406-N provide independent signal processing processes for a plurality of streams generated through digital beamforming. However, according to an implementation method, some of the elements of the transmission paths 406-1 to 406-N may be used in common.

The analog beamformer 408 performs beamforming on analog signals. To this end, the digital beamformer 404 multiplies the analog signals by beamforming weights. The beamforming weights are used to change the magnitude and phase of the signal. Specifically, the analog beamformer 408 may be variously configured according to a connection structure between the transmission paths 406-1 to 406-N and antennas. For example, each of the transmission paths 406-1 to 406-N may be connected to one antenna array. As another example, the transmission paths 406-1 to 406-N may be connected to one antenna array. As another example, the transmission paths 406-1 to 406-N may be adaptively connected to one antenna array, or may be connected to two or more antenna arrays.

Figure 5:
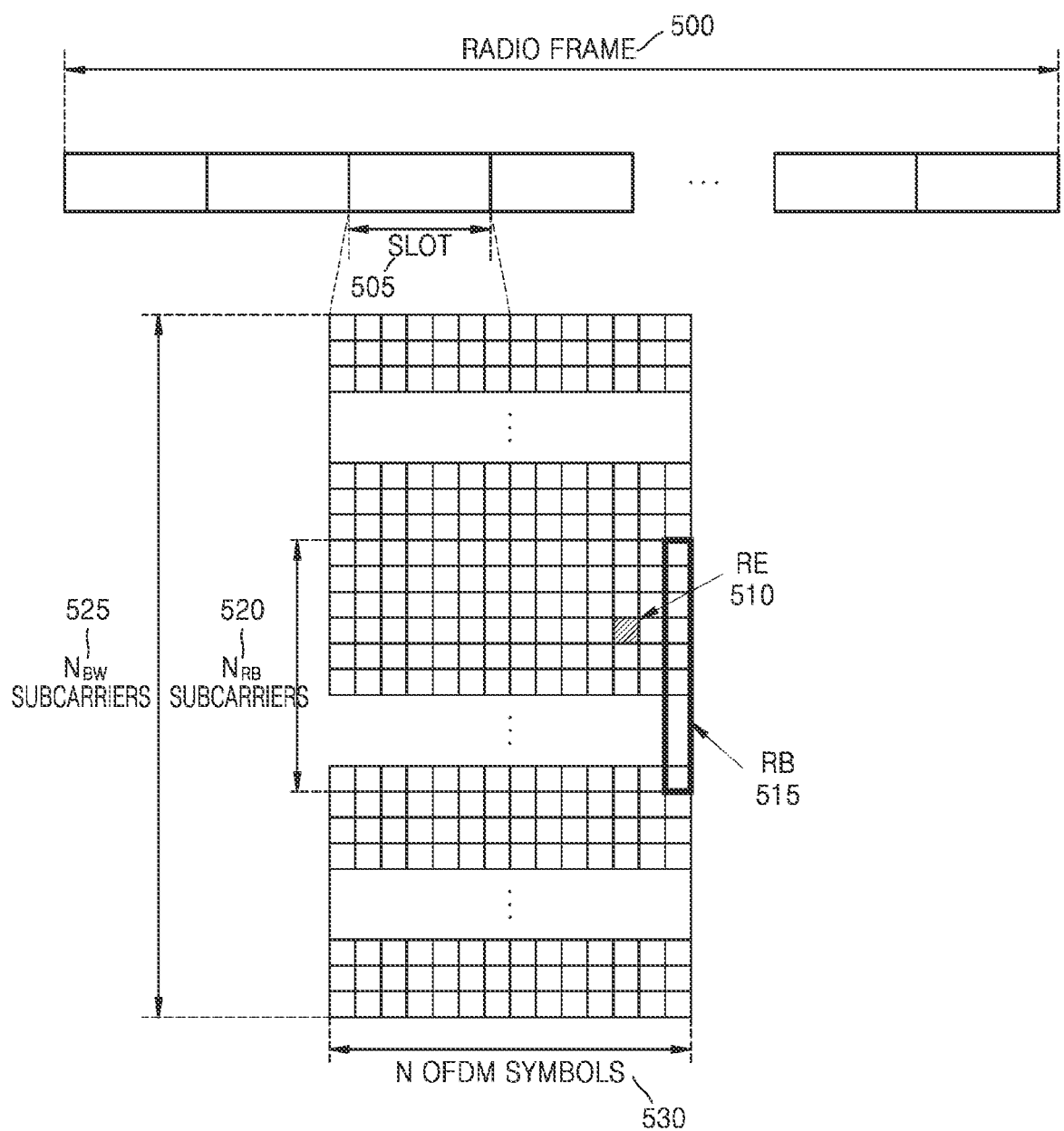
FIG. 5 illustrates a structure of a radio time-frequency resource in a wireless communication system, according to an embodiment of the present disclosure.

FIG. 5 illustrates a structure of a radio time-frequency resource in a wireless communication system, according to an embodiment of the present disclosure.

Referring to FIG. 5, in a radio resource domain, the horizontal axis represents a time domain, and the vertical axis represents a frequency domain. A minimum transmission unit in the time domain is an OFDM symbol or a discrete Fourier transform-spread-OFDM (DFT-S-OFDM) symbol, and $N_{symb}$ OFDM symbols or DFT-S-OFDM symbols 530 are included in one slot 505, Unlike a slot, in an NR system, a length of a subframe may be defined as 1.0 ms, and a radio frame 500 may be defined as 10 ms. A minimum transmission unit in the frequency domain is a subcarrier, and an entire system transmission bandwidth may include a total of Navy subcarriers 525. Specific values such as $N_{symb}$ and $N_{BW}$ may be variably applied depending on a system.

A basic unit of a time-frequency resource domain is a resource element (RE) 510, which may be represented by an OFDM symbol index or a DFT-S-OFDM symbol index and a subcarrier index. A resource block (RB) 515 may be defined as $N_{RB}$ consecutive subcarriers 520 in the frequency domain. In general, a minimum transmission unit of data is an RB unit. In an NR system, $N_{symb}=14$ and $N_{RB}=12$ in general.

The structure of the radio time-frequency resource as illustrated in FIG. 5 is applied to a Uu interface. Also, the structure of the radio time-frequency resource as illustrated in FIG. 5 may be similarly applied to a SL.

Figure 6A:
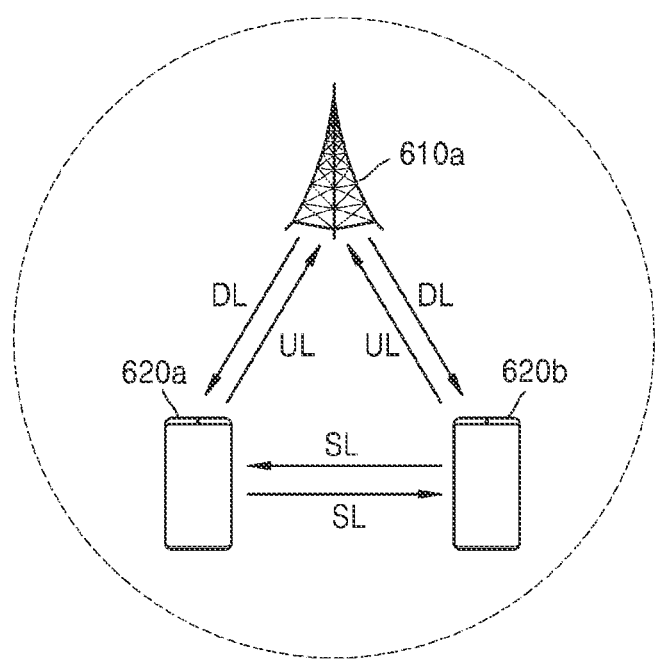
FIG. 6A is a diagram illustrating a scenario for sidelink communication, according to an embodiment of the present disclosure.

FIG. 6A illustrates an example of a scenario for SL communication, according to an embodiment of the present disclosure.

FIG. 6A illustrates an example of an in-coverage scenario in which SL terminals 620a and 620b are located within a coverage of a base station 610. The SL terminals 620a and 620b may receive data and control information from the base station 610 through a DL, or may transmit data and control information to the base station 610 through a UL. In this case, the data and the control information may be data and control information for SL communication or data and control information for general cellular communication other than SL communication. Also, in FIG. 6A, the SL terminals 620a and 620b may transmit and receive data and control information for SL communication through the SL.

Figure 6B:
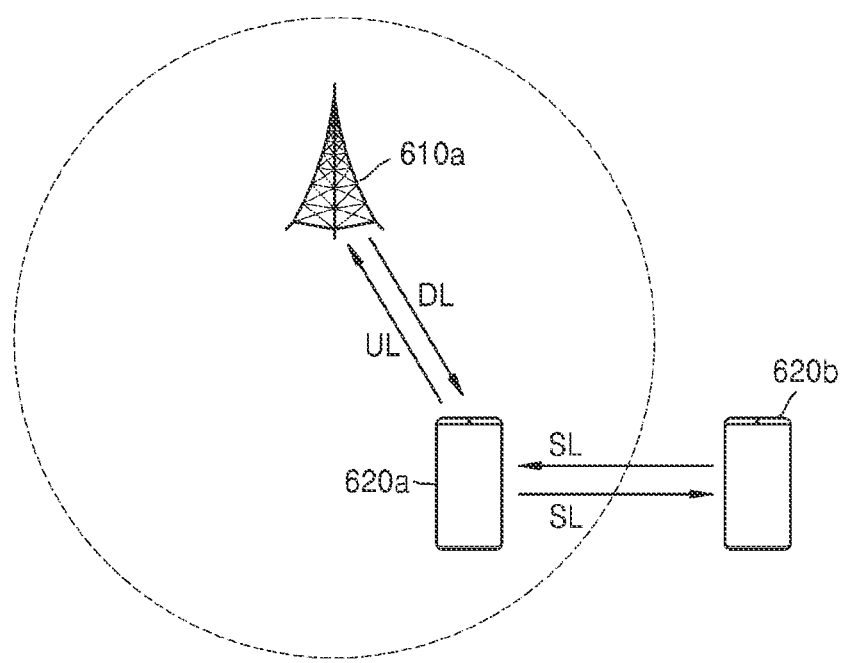
FIG. 6B is a diagram illustrating a scenario for sidelink communication, according to an embodiment of the present disclosure.

FIG. 6B illustrates an example of a scenario for SL communication, according to an embodiment of the present disclosure.

FIG. 63 illustrates a case of a partial coverage in which a first terminal 620a among SL terminals is located within a coverage of a base station 610, and a second terminal 620b among the SL terminals is located outside the coverage of the base station 610. The first terminal 620a located within the coverage of the base station 610 may receive data and control information from the base station through a DL, or may transmit data and control information to the base station through a UL. The second terminal 620b located outside the coverage of the base station 610 is unable to receive data and control information from the base station through the DL, and is unable to transmit data and control information to the base station through the UL. The second terminal 620b may transmit and receive data and control information for SL communication to and from the first terminal 620a through the SL.

Figure 6C:
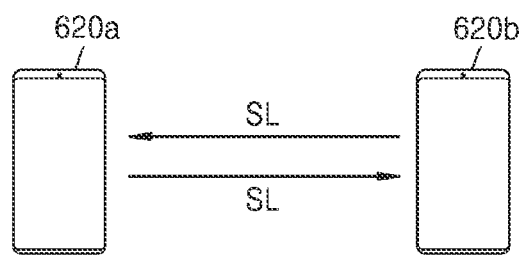
FIG. 6C is a diagram illustrating a scenario for sidelink communication, according to an embodiment of the present disclosure.

FIG. 6C illustrates an example of a scenario for SL communication, according to an embodiment of the present disclosure.

FIG. 6C illustrates a case where SL terminals (e.g., a first terminal 620a and a second terminal 620b) are located outside a coverage of a base station. Therefore, the first terminal 620a and the second terminal 620b are unable to receive data and control information from the base station through a DL, and are unable to transmit data and control information to the base station through a UL. The first terminal 620a and the second terminal 620b may transmit and receive data and control information for SL communication through a SL.

Figure 6D:
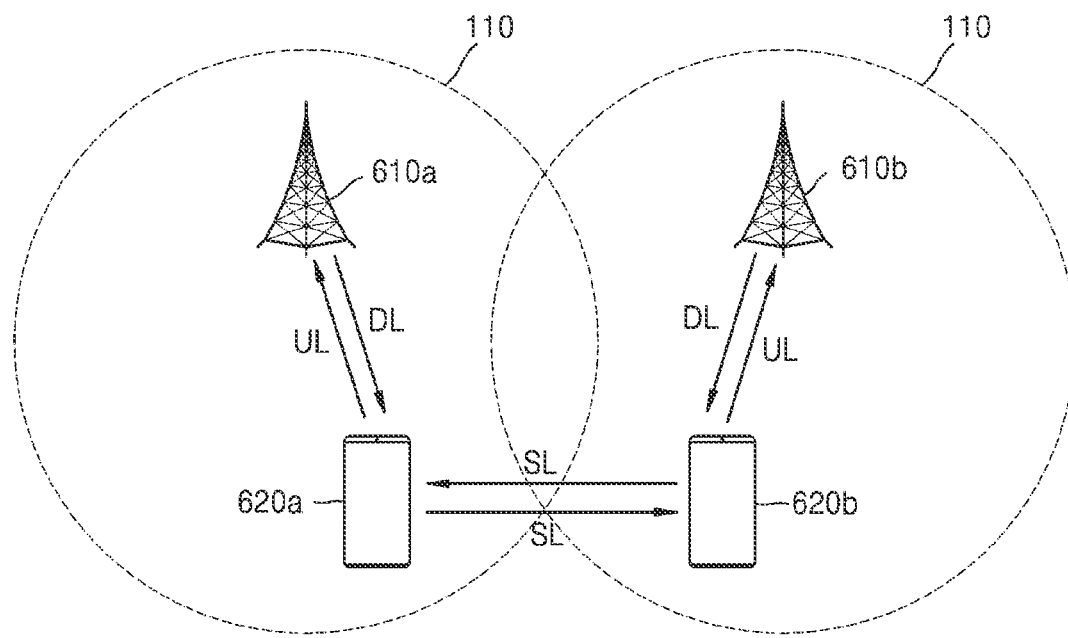
FIG. 6D is a diagram illustrating a scenario for sidelink communication, according to an embodiment of the present disclosure.

FIG. 6D illustrates an example of a scenario for SL communication, according to an embodiment of the present disclosure.

Referring to FIG. 6D, a first terminal 620a and a second terminal 620b, which perform SL communication, may perform inter-cell SL communication in a state (e.g., a RRC connected state) of being connected to different base stations (e.g., a first base station 610a and a second base station 610b) or in a camped state (e.g., a RRC connection-released state, that is, a RRC idle state). In this case, the first terminal 620a may be a SL transmitting terminal and the second terminal 620b may be a SL receiving terminal. Alternatively, the first terminal 620a may be a SL receiving terminal and the second terminal 620b may be a SL transmitting terminal. The first terminal 620a may receive a SL dedicated system information block (SIB) from the base station 610a to which the first terminal 620a is connected (or on which the first terminal 620a is camped), and the second terminal 620b may receive a SL dedicated SIB from another base station 620b to which the second terminal 620b is connected (or on which the second terminal 620b is camped). In this case, the SL dedicated SIB received by the first terminal 620a may be different from the SL dedicated SIB received by the second terminal 620b. Accordingly, it is necessary to unify pieces of information in order to perform SL communication between terminals located in different cells.

In the examples of FIGS. 6A to 6D described above, for convenience of explanation, the SL system including two terminals (e.g., the first terminal 610a and the second terminal 620b) has been described as an example, but the present disclosure is not limited thereto and may be applied to SL systems in which two or more terminals participate. Also, the UL and the DL between the base stations 610, 610a, and 610b and the SL terminals 620a and 620b may be referred to as a Uu interface, and the SL between the SL terminals may be referred to as a PC-5 interface. In the following description, the UL, the DL, the Uu interface, the SL, and the PC-5 may be used interchangeably.

On the other hand, in the present disclosure, the terminal may refer to a vehicle that supports V2V communication, a vehicle that supports V2P communication, a pedestrian's handset (e.g., a smartphone), a vehicle that supports V2N communication, or a vehicle that supports V2I communication. Also, in the present disclosure, the terminal may refer to a RSU having a terminal function, a RSU having a base station function, or a RSU having a part of a base station function and a part of a terminal function.

Figure 7A:
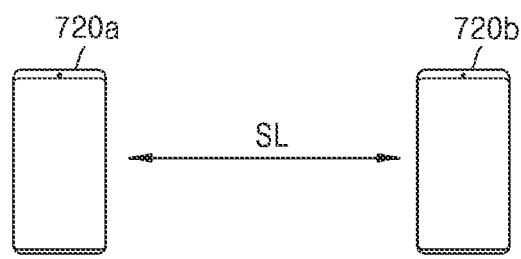
FIG. 7A is a diagram for describing a transmission method of sidelink communication, according to an embodiment of the present disclosure.
Figure 7B:
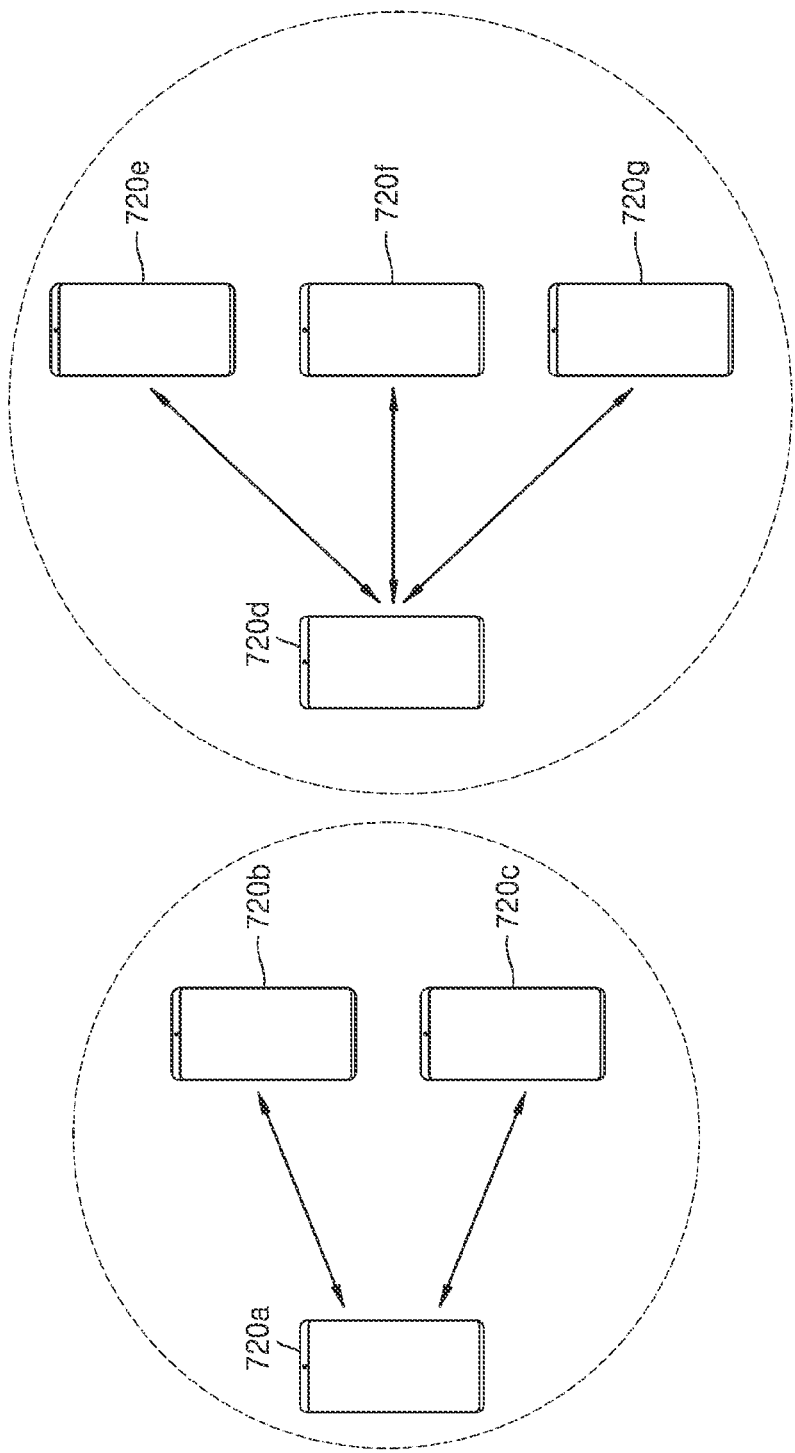
FIG. 7B is a diagram for describing a transmission method of sidelink communication, according to an embodiment of the present disclosure.

FIGS. 7A and 7B are diagrams for describing a transmission method of SL communication, according to an embodiment of the present disclosure.

Specifically, FIG. 7A illustrates a unicast scheme, and FIG. 78 illustrates a groupcast scheme.

Referring to FIG. 7A, a transmitting terminal 720a and a receiving terminal 720b may perform one-to-one communication. The transmission method illustrated in FIG. 7A may be referred to as unicast communication. Referring to FIG. 7B, transmitting terminal 720a or 720d and receiving terminals 720b, 720c, 720e, 720f, and 720g may perform one-to-many communication. The transmission method illustrated FIG. 7B may be referred to as groupcast or multicast. In FIG. 78, the first terminal 720a, the second terminal 720b, and the third terminal 720c form one group and perform groupcast communication, and the fourth terminal 720d, the fifth terminal 720e, the sixth terminal 720f, and the seventh terminal 720g form another group and perform groupcast communication. The terminals may perform groupcast communication within a group to which the terminals belong, and may perform unicast, groupcast, or broadcast communication with at least one other terminal belonging to different groups. Although two groups are illustrated in FIG. 7B for convenience of explanation, the present disclosure is not limited thereto and may also be applied to a case where more groups are formed.

On the other hand, although not illustrated in FIG. 7A or 73, SL terminals may perform broadcast communication. The broadcast communication refers to a method by which all SL terminals receive data and control information transmitted through the SL by the SL transmitting terminal. For example, in FIG. 7B, when the first terminal 720a is a transmitting terminal, the remaining terminals 720b, 720c, 720d, 720e, 720f, and 720g may receive data and control information transmitted by the first terminal 720a.

The SL unicast communication, groupcast communication, and broadcast communication described above may be supported in an in-coverage scenario, a partial-coverage scenario, or an out-of-coverage scenario.

In the case of NR SL, unlike LTE SL, the support of a transmission type in which a vehicle terminal transmits data to only one specific terminal through unicast and a transmission type in which a vehicle terminal transmits data to a plurality of specific terminals through groupcast may be considered. For example, when considering a service scenario such as platooning, which is a technology that connects two or more vehicles in a single network and moves the two or more vehicles in a cluster form, the unicast and groupcast technologies may be usefully used. Specifically, a leader terminal of a group connected by platooning may use unicast communication for the purpose of controlling one specific terminal, and may use groupcast communication for the purpose of simultaneously controlling a group including a plurality of specific terminals.

Resource allocation in the V2X system may be performed by using the following methods.

(1) Mode 1 resource allocation Scheduled resource allocation is a method, performed by a base station, of allocating resources to be used for SL transmission to RRC-connected UEs in a dedicated scheduling method. Because the base station may manage SL resources, the scheduled resource allocation method may be effective for interference management and resource pool management (dynamic allocation and/or semi-persistent transmission). When there is data to be transmitted to other UE(s), the UE in the RRC-connected mode may transmit, to the base station, information notifying that there is data to be transmitted to other UE(s) by using an RRC message or a MAC CE. For example, the RRC message transmitted from the UE to the base station may be a SL UE information (SidelinkUEInformation) or UE assistance information (UEAssistanceInformation) message, and the MAC CE may correspond to scheduling request (SR) or BSR MAC CE including at least one of an indicator indicating a buffer status report (BSR) for V2X communication and information about a size of data buffered for SL communication.

(2) Mode 2 Resource Avocation

Second, UE autonomous resource selection is a method by which a SL transmission/reception resource pool for V2X is provided to a UE through system information or a RRC message (e.g., a RRCReconfiguration message, a PC5-RRC message, etc.) and the UE selects a resource pool and resources according to a prescribed rule. The UE autonomous resource selection may correspond to one or more of the following resource allocation methods.

The UE autonomously selects SL resource for transmission.
The UE assists SL resource selection for other UEs,
The UE is configured with NR configured grant for SL transmission.
The UE may schedule SL transmission of other UEs.
The resource selection method of the UE may include zone mapping, sensing-based resource selection, random selection, etc.
Additionally, even when the UE exists in the coverage of the base station, resource allocation or resource selection may not be performed in the scheduled resource allocation or UE autonomous resource selection mode. In this case, the UE may perform V2X SL communication through a preconfigured SL transmission/reception resource pool (preconfiguration resource pool).
Also; when UEs for V2X communication exist outside the coverage of the base station, the UEs may perform V2X SL communication through the preconfigured SL transmission/reception resource pool.

According to an embodiment of the present disclosure; the UE may support EUTRA (LTE), NR (5G), or EUTRA/NR for a Uu interface performing data transmission and reception with the base station. The UE may support LTE or NR for a SL interface performing data transmission and reception with another UE. The base station may support a Uu radio function of at least one of EUTRA or NR, and may support a SL radio function of at least one of LTE or NR. The UE may support a SL radio function of at least one of LTE or NR, and may support a Uu radio function of at least one of EUTRA or NR. The base station and the UE may support the same RAT radio function for the Uu interface and the SL interface. For example, the base station and the UE may support a NR Uu radio function and support a NR SL radio function. For example, the base station and the UE may support an EUTRA Uu radio function and support a LTE sidelink radio function. The base station and the UE may support a cross-RAT radio function for the Uu interface and the SL interface. For example, the base station and the UE may support a NR Uu radio function and support a LTE sidelink function. For example, the base station and the UE may support a NR SL radio function and support an EUTRA Uu radio function. The base station and the UE may support one or more RAT radio functions for the Uu interface. The base station and the UE may support a LTE SL radio function while supporting one or more RAT radio functions for the Uu interface. The base station and the UE may support a NR SL radio function while supporting one or more RAT radio functions for the Uu interface. The base station and the UE may process radio capability information for the Uu interface and radio capability information for the SL interface. In this case, radio function information for at least one RAT supported by the base station and the UE may be processed. A Uu interface message for processing radio capability information may include a UE capability enquiry (UCE) message and a UE capability information (UCI) message. The UCE message may be transmitted to the UE by the base station, and the UCI message may be transmitted to the base station by the UE. A SL interface message for processing SL radio capability information may include a sidelink UE capability Enquiry (SL-UCE) message and a sidelink UE capability information (SL-UCI) message. The SL-UCE message and the SL-UCI message may be transmitted between UEs.

1. Processing of SL Radio Capability Information Through Uu Interface

Embodiment 1

The existing RAT type is for Uu interface in 3GPP TS 38.331. For sidelink interface, a separate indication, i.e., sidelink RAT type is defined for pre-filtering of sidelink capability information. Sidelink capability information should be reported based on the sidelink RAT type filter.

The existing RAT type is for Uu interface in 3GPP TS 38,331. For sidelink interface a separate indication i.e., sidelink RAT type is defined for pre-filtering of sidelink capability information. Sidelink capability information should be reported based on the sidelink RAT type filter.

The base station may transmit a Uu RAT type filter and a supportable SL RAT type filter to the UE by including the same in the UCE message, and the UE may configure SL capability information based on the Uu RAT type filter and the SL RAT type filter and transmit the UCI message to the base station.

Embodiment 2

The existing RAT type in TS 38.331 may be used for sidelink interface. When the RAT type is included in UECapabilityEnguiry and sidelink band list is included in the UECapabilityEnguiry, UE may report UE capability information of all sidelink interfaces (i.e., LTE PC5, NR PC5) which the UE supports.

The existing RAT type for Uu interface in TS 38.331 can be used for sidelink interface. If the RAT type is included in UECapabilityEnquiry and sidelink band list is included in the UECapabilityEnguiry, UE can report UE capability information of all sidelink interfaces (i.e., LTE PC5, NR PC5) which the UE supports.

The base station may transmit a Uu RAT type filter to the UE by including the same in the UCE message, and the UE may configure SL capability information based on all SL RAT types which the UE may support, and transmit the UCI message to the base station.

Embodiment 3

The existing RAT type in TS 38.331 may be used for sidelink interface. When UE has received UECapabilityEnquiry which may include RAT type and sidelink band list, UE may identify which sidelink RAT related SIB (LTE SIB, NR SIB, or both) is provided through the sidelink by NW. UE may report UE capability information of the corresponding sidelink interfaces (i.e., LTE PC5, NR PC5) of the provided sidelink SIB and which the UE supports.

The existing RAT type for Uu interface in TS 38,331 can be used for sidelink interface. When UE has received UECapabilityEnquiry which can include RAT type and sidelink band list, UE can identify which sidelink RAT related SIB (LTE SIB, NR SIB or both) is provided through the Sidelink SIB by NW. UE can report UE capability information of the corresponding sidelink interfaces (i.e., LTE PC5, NR PC5) of the provided Sidelink SIB and which the UE supports.

The base station may transmit a Uu RAT type filter to the UE by including the same in the UCE message, and the UE may configure SL capability information based on SL RAT information included in a SL SIB which the base station provides, and transmit the UCI message to the base station.

Figure 8:
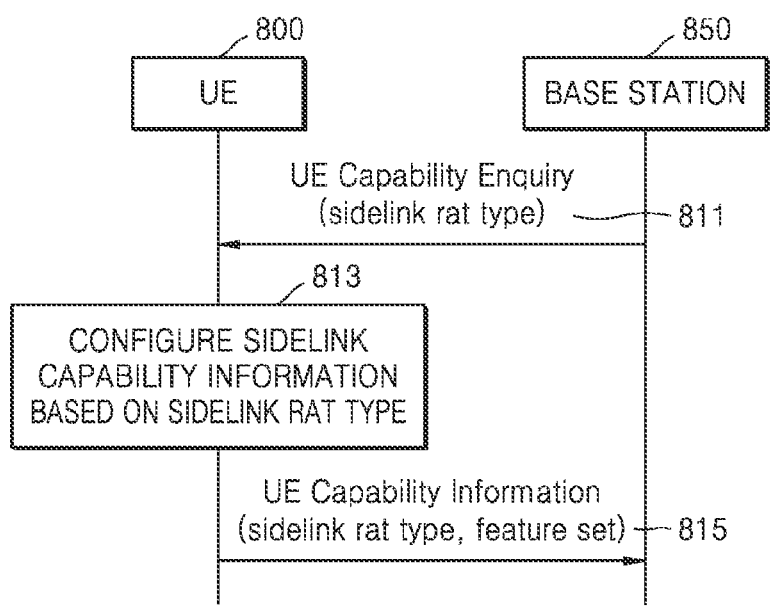
FIG. 8 illustrates a signaling flow between a terminal and a base station, which processes sidelink capability information, according to an embodiment of the present disclosure.

FIG. 8 is a flowchart of a signaling flow between a UE and a base station, which processes SL capability information, according to an embodiment of the present disclosure.

Referring to FIG. 8, in operation 811, a base station 850 may transmit a UCE message to a UE 800. The UCE message may include RAT type information of a Uu interface. The Uu RAT type information included in the UCE message may indicate capability information of the Uu RAT that the UE 800 should include when configuring the UCI message. The Uu RAT type may include EUTRA, NR, and EUTRA-NR, For example, the base station 850 may include Uu frequency information in the UCE message. The Uu frequency information included in the UCE message may indicate a Uu frequency that the UE 800 should include when configuring the UCI message, and capability information therefor. In operation 811, the base station 850 may include RAT type information of the SL interface in order to obtain SL capability information of the UE 800. The SL RAT type may include LTE and NR. In operation 811, the base station 850 may include SL frequency information in the UCE message.

In operation 813, the UE 800 may configure Uu radio capability information of the UE 800 according to the Uu RAT type and the Uu frequency information of the received UCE message. The Uu capability information may include at least one of Uu frequency information or Uu feature set information. The Uu frequency information included in the Uu capability information may include frequency information that the UE may support in correspondence to a frequency band included in the Uu frequency information of the UCE message. The Uu feature set information may include at least one of a Uu SDAP feature, a Uu PDCP feature, a Uu RLC feature, a Uu MAC feature, or a Uu PHY feature. In operation 813, the UE 800 may configure SL capability information of the UE 800 according to the SL RAT type and the SL frequency information of the received UCE message. The SL capability information may include at least one of the SL frequency information or the SL feature set information. The SL frequency information may include at least one of a band list in which the UE 800 supports only the SL, a band combination in which the UE supports only the S. or a band combination for a frequency that supports the SL among Uu frequencies. The SL feature set information may include at least one of a SL SDAP feature, a SL PDCP feature, a SL RLC feature, a SL MAC feature, or a SL PHY feature.

In operation 815, the UE 800 may transmit, to the base station 850, the UCI message including at least one of the Uu radio capability information or the SL radio capability information configured in operation 813 described above.

The UCE message used in the embodiment of FIG. 8 may include an information element of [Table 1] below. [Table 1] may correspond to a case where the base station 850 transmits the UCE message through the NR interface,

TABLE 1

```
UE-CapabilityRAT-RequestList           ::=     SEQUENCE   (SIZE   (1..maxRAT-
CapabilityContainers)) OF UE-CapabilityRAT-Request
UE-CapabilityRAT-Request ::=       SEQUENCE {
    rat-Type                       RAT-Type,    // nr, eutra-nr, eutra
    capabilityRequestFilter        OCTET STRING            OPTIONAL,   -- Need N
    ...
}
UE-CapabilityRequestFilterNR           ::=                SEQUENCE {
    frequencyBandListFilter        FreqBandList           OPTIONAL,    -- Need N
    nonCriticalExtension                       UE-CapabilityRequestFilterNR-v1540
OPTIONAL
}
UE-CapabilityRequestFilterNR-v1540 ::=          SEQUENCE {
    srs-SwitchingTimeRequest       ENUMERATED {true} OPTIONAL,     -- Need N
    nonCriticalExtension   UE-CapabilityRequestFilterNR-v16xx    OPTIONAL
}
UE-CapabilityRequestFilterNR-v16xx ::=          SEQUENCE {
    sl-UE-CapabilityRAT-RequestList            UE-CapabilityRATSL-RequestList
OPTIONAL, -- Need N
    noncriticalExtension           SEQUENCE { }
}
```

TABLE 1-continued

```
UE-CapabilityRATSL-RequestList         ::=      SEQUENCE    (SIZE    (1..maxSLRAT-
CapabilityContainers)) OF UE-CapabilityRATSL-Request
UE-CapabilityRATSL-Request             ::=      SEQUENCE {
    slRat-Type                         SL-RAT-Type,         // nr pc5, lte pc5
    capabilityRequestFilterSL          OCTET STRING         OPTIONAL,   -- Need N
}
UE-CapabilityRequestFilterSL ::=                SEQUENCE {
    slfrequencyBandListFilter          SLFreqBandList       OPTIONAL,   -- Need N
    nonCriticalExtension               SEQUENCE { } OPTIONAL
}
```

The UCE message used in the embodiment of FIG. 8 may include an information element of [Table 2] below. [Table 2] may correspond to a case where the base station 850 transmits the UCE message through the EUTRA interface,

TABLE 2

```
UECapabilityEnquiry-v1510-IEs ::=     SEQUENCE {
    requestedFreqBandsNR-MRDC-r15       OCTET STRING                OPTIONAL,
//FreqBandList IE
    nonCriticalExtension                UECapabilityEnquiry-v1530-IEs
        OPTIONAL
}
UECapabilityEnquiry-v1530-IEs ::=     SEQUENCE {
    requestSTTI-SPT-Capability-r15        ENUMERATED {true}      OPTIONAL,
    eutra-nr-only-r15                   ENUMERATED {true} OPTIONAL,    //(NG)EN-DC
only
    nonCriticalExtension                UECapabilityEnquiry-v1550-IEs
        OPTIONAL
}
UECapabilityEnquiry-v1550-IEs ::=     SEQUENCE {
    requestedCapabilityNR-r15           OCTET STRING                OPTIONAL,
//UE-CapabilityRequestFilterNR in [table 1]
    nonCriticalExtension                UECapabilityEnquiry-v1560-IEs
        OPTIONAL
}
UECapabilityEnquiry-v1560-IEs ::=     SEQUENCE {
    requestedCapabilityCommon-r15       OCTET STRING                OPTIONAL,
//filter common for MR-DC
    nonCriticalExtension                SEQUENCE { }OPTIONAL
}
UE-CapabilityRequest ::=              SEQUENCE    (SIZE    (1..maxRAT-Capabilities)) OF
RAT-Type
```

Figure 9:
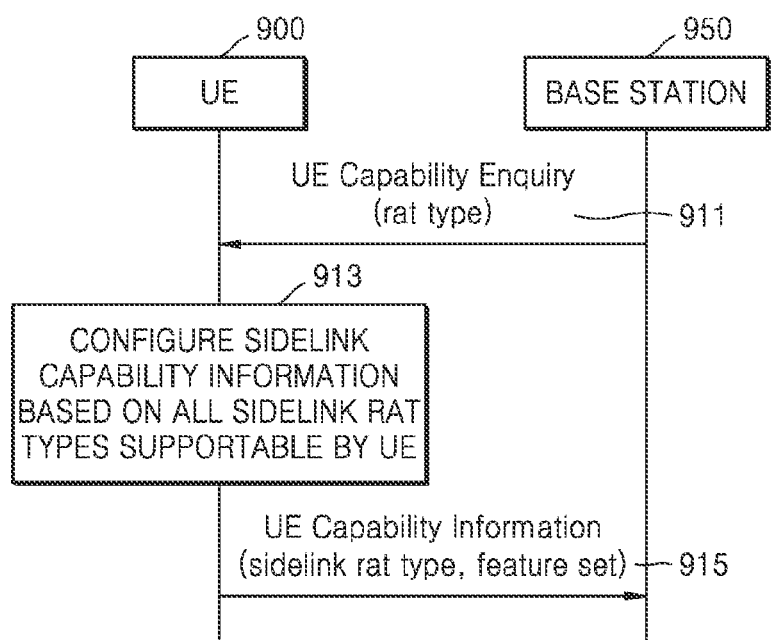
FIG. 9 illustrates a signaling flow between a terminal and a base station, which processes sidelink capability information, according to an embodiment of the present disclosure.

FIG. 9 illustrates a signaling flow between a UE and a base station, which processes SL capability information, according to an embodiment of the present disclosure.

Referring to FIG. 9, in operation 911, a base station 950 may transmit a UCE message to a UE 900. The UCE message may include RAT type information of a Uu interface. The Uu RAT type information included in the UCE message may indicate capability information of the Uu RAT that the UE 900 should include when configuring the UCI message. The Uu RAT type may include EUTRA, NR, and EUTRA-NR. The base station 950 may include Uu frequency information in the UCE message. The Uu frequency information included in the UCE message may indicate a Uu frequency that the UE 900 should include when configuring the UCI message, and capability information therefor. In operation 911, the base station 950 may include SL frequency information in the UCE message in order to obtain SL radio capability information of the UE 900.

In operation 913, the UE 900 may configure Uu capability information of the UE 900 according to the Uu RAT type and the Uu frequency information of the received UCE message. The Uu capability information may include at least one of Uu frequency information or Uu feature set information. The Uu feature set information may include at least one of a Uu SDAP feature, a Uu PDCP feature, a Uu RLC feature, a Uu MAC feature, or a Uu PHY feature. In operation 913, the UE 900 may configure SL radio capability information of the UE according to the SL frequency information of the received UCE message. The UE 900 may configure SL capability information for all SL RAT types which the UE 900 supports. The SL capability information may include at least one of the SL frequency information or the SL feature set information. The SL frequency information may include at least one of a band list in which the UE 900 supports only the SL, a band combination in which the UE supports only the S, or a band combination for a frequency that supports the SL among Uu frequencies. The SL feature set information may include at least one of a SL SDAP feature, a SL PDCP feature, a SL RLC feature, a SL MAC feature, or a SL PHY feature.

In operation 915, the UE 900 may transmit, to the base station 950, the UCI message including at least one of the Uu radio capability information or the SL radio capability information configured in operation 913 described above.

The UCE message used in the embodiment of FIG. 9 may include an information element of [Table 3] below. [Table 3] may correspond to a case where the base station 950 transmits the UCE message through the NR interface.

TABLE 3

```
UE-CapabilityRAT-RequestList ::= SEQUENCE (SIZE (1..maxRAT-
CapabilityContainers)) OF UE-CapabilityRAT-Request
UE-CapabilityRAT-Request ::=    SEQUENCE {
    rat-Type                    RAT-Type,       // nr, eutra-nr, eutra
    capabilityRequestFilter     OCTET STRING        OPTIONAL,    -- Need N
    ...
}
UE-CapabilityRequestFilterNR        ::=             SEQUENCE {
    frequencyBandListFilter     FreqBandList        OPTIONAL,    -- Need N
    nonCriticalExtension                    UE-CapabilityRequestFilterNR-v1540
OPTIONAL
}
UE-CapabilityRequestFilterNR-v1540 ::=      SEQUENCE {
    srs-SwitchingTimeRequest    ENUMERATED {true} OPTIONAL,     -- Need N
    nonCriticalExtension    UE-CapabilityRequestFilterNR-v16xx    OPTIONAL
}
UE-CapabilityRequestFilterNR-v16xx ::=    SEQUENCE    {
    slfrequencyBandListFilter   SLFreqBandList      OPTIONAL,    -- Need
N
    noncriticalExtension        SEQUENCE { }
}
```

The UCE message used in the embodiment of FIG. 9 may include an information element of [Table 4] below. [Table 4] may correspond to a case where the base station 950 transmits the UCE message through the EUTRA interface.

TABLE 4

```
UECapabilityEnquiry-v1510-IEs ::=   SEQUENCE {
    requestedFreqBandsNR-MRDC-r15    OCTET STRING               OPTIONAL,
//FreqBandList IE
    nonCriticalExtension             UECapabilityEnquiry-v1530-IEs
OPTIONAL
}
UECapabilityEnquiry-v1530-IEs ::=    SEQUENCE {
    requestSTTI-SPT-Capability-r15      ENUMERATED {true} OPTIONAL,
    eutra-nr-only-r15                ENUMERATED {true} OPTIONAL,     //(NG)EN-DC
only
    nonCriticalExtension             UECapabilityEnquiry-v1550-IEs
OPTIONAL
}
UECapabilityEnquiry-v1550-IEs ::=    SEQUENCE {
    requestedCapabilityNR-r15        OCTET STRING               OPTIONAL,
//UE-CapabilityRequestFilterNR in [table 1]
    nonCriticalExtension             UECapabilityEnquiry-v1560-IEs
OPTIONAL
}
UECapabilityEnquiry-v1560-IEs ::=    SEQUENCE {
    requestedCapabilityCommon-r15    OCTET STRING               OPTIONAL,
//filter common for MR-DC
nonCriticalExtension                 SEQUENCE { }OPTIONAL
}
UE-CapabilityRequest ::=         SEQUENCE   (SIZE   (1..maxRAT-Capabilities))   OF
RAT-Type
```

As another embodiment of the present disclosure, when the UE 900 receives the UCE message, the SL frequency information is not included, but when the UE 900 determines to transmit the SL capability information of the UE 900 to the base station 950, the UE 900 may perform the procedures of operations 913 to 915 described above.

A case where the UE does not use the SL SIB information provided by the base station for processing the SL capability information has been described with reference to FIGS. 8 and 9. The SL SIB information provided by the base station may include at least one of an LTE SIB including configuration information for an LTE SL or an NR SIB including configuration information for an NR SL. Therefore, when the SL RAT type is not indicated in the UCE message, the UE may determine the SL RAT to be reported to the base station based on the SL SIB information. Hereinafter, a UE operation of processing SL capability information based on SL SIB information will be described with reference to FIG. 10.

Figure 10:
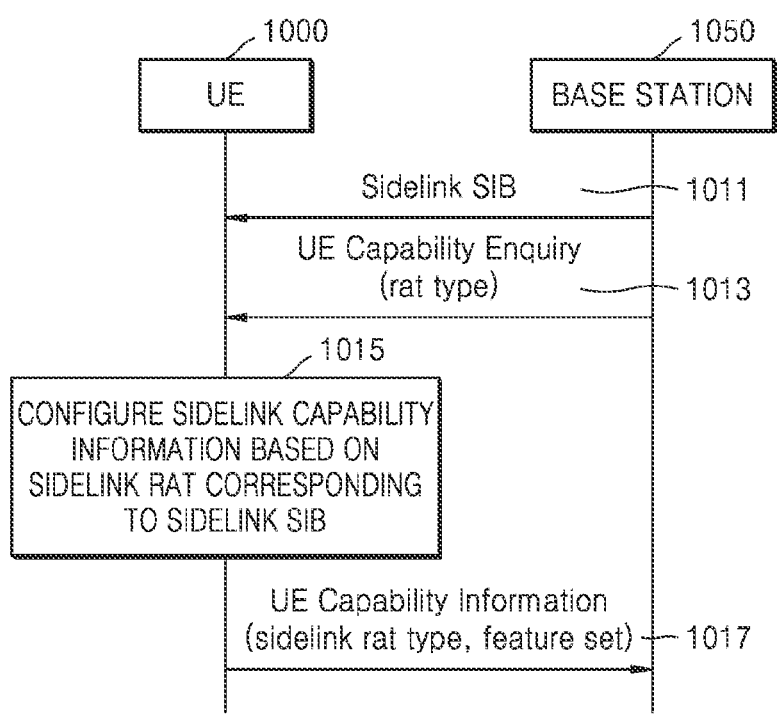
FIG. 10 illustrates a signaling flow between a terminal and a base station, which processes sidelink radio capability information, according to embodiments of the present disclosure.

FIG. 10 illustrates a signaling flow between a UE and a base station, which processes SL capability information by using a SIB, according to an embodiment of the present disclosure.

Referring to FIG. 10, in operation 1011, a base station 1050 may provide a SL SIB. The SL SIB may include at least one of an LIE SIB including LIE SL configuration information or an NR SIB including NR SL configuration information.

In operation 1013, the base station 1050 may transmit a UCE message to a UE 1000. The UCE message may include RAT type information of a Uu interface. The Uu RAT type information included in the UCE message may indicate capability information of the Uu RAT that the UE 1000 should include when configuring a UCI message. The Uu RAT type may include EUTRA, NR, and EUTRA-NR. The base station 1050 may include Uu frequency information in the UCE message. The Uu frequency information included in the UCE message may indicate a Uu frequency that the UE 1000 should include when configuring the UCI message, and capability information therefor. In operation 1013, the base station 1050 may include SL frequency information in the UCE message in order to obtain SL radio capability information of the UE 1000. The UCE message in operation 1013 may include information of [Table 3] and [Table 4].

In operation 1015, the UE 1000 may configure Uu radio capability information of the UE 1000 according to the Uu RAT type and the Uu frequency information of the received UCE message. The Uu radio capability information may include at least one of Uu frequency information or Uu feature set information. The Uu feature set information may include at least one of a Uu SDAP feature, a Uu PDCP feature, a Uu RLC feature, a Uu MAC feature, or a Uu PHY feature. In operation 1015, the UE 1000 may configure SL capability information of the UE 1000 according to the SL frequency information of the received UCE message. The UE 1000 may configure SL capability information supported by the UE 1000 with respect to the RAT type of the SL SIB provided by the base station 1050 in operation 1011. When the SL SIB in operation 1011 includes a LTE SIB, the UE 1000 may configure capability information capable of supporting a LTE SL, When the SL SIB in operation 1011 includes a NR SIB, the UE 1000 may configure capability information capable of supporting a NR SL. The SL capability information may include at least one of the SL frequency information or the SL feature set information. The SL frequency information may include at least one of a band list in which the UE 1000 supports only the SL, a band combination in which the UE supports only the SL, or a band combination for a frequency that supports the SL among Uu frequencies. The SL feature set information may include at least one of a SL SDAP feature, a SL PDCP feature, a SL RLC feature, a SL MAC feature, or a SL PHY feature.

In operation 1017, the UE 1000 may transmit, to the base station 1050, the UCI message including at least one of the Uu capability information or the SL radio capability information configured in operation 1015 described above.

As another embodiment of the present disclosure, when the UE 1000 receives the UCE message, the SL frequency information is not included in the UCE message, but when the UE 1000 determines to transmit the SL capability information of the UE 1000 to the base station 1050, the UE 1000 may perform the procedures of operations 1015 to 1017 described above.

2. Processing of SL radio capability information through SL interface (Embodiment 1) The UE may configure a SL-UCE message including a supportable SL frequency filter and transmit the configured SL-UCE message to the counterpart UE, and the counterpart UE may configure SL capability information based on supportable SL frequency information and transmit a SL-UCI message to the UE. The SL frequency filter may be set directly by the UE, may be set based on filtering information of the UCE message received from the base station (e.g., information supportable by the UE is set as filtering information), or may be set to be the same as filtering of the UCE message received from the base station.

(Embodiment 2) The UE may configure a SL-UCE message including a supportable SL frequency filter and SL RAT type filter information and transmit the configured SL-UCE message to the counterpart UE, and the counterpart UE may configure SL capability information based on supportable frequency information and SL RAT type information and transmit a SL-UCI message to the UE. The SL frequency filter and the SL RAT type filter may be set directly by the UE, may be set based on filtering information of the UCE message received from the base station (e.g., information supportable by the UE is set as filtering information), or may be set to be the same as filtering of the UCE message received from the base station.

Figure 11:
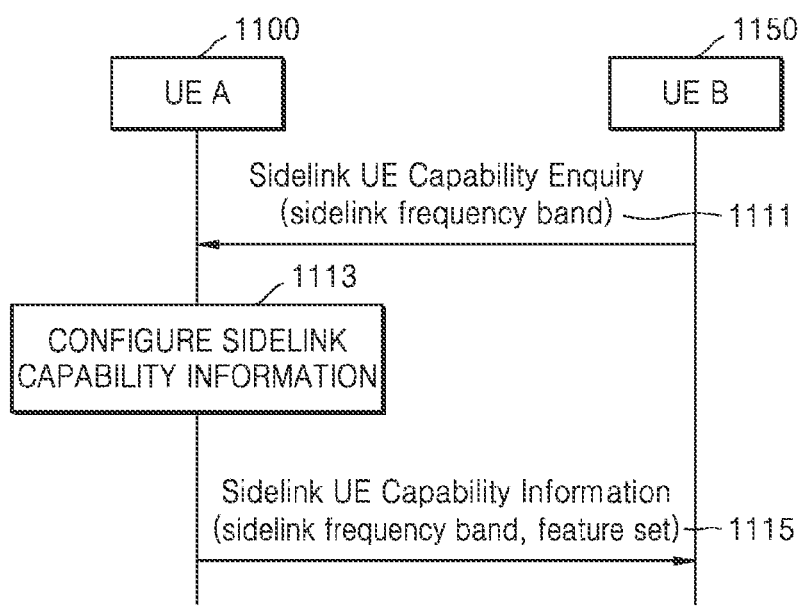
FIG. 11 illustrates a signaling flow between terminals, which processes sidelink radio capability information, according to embodiments of the present disclosure.

FIG. 11 illustrates a signaling flow between UEs, which processes SL capability information, according to an embodiment of the present disclosure.

Referring to FIG. 11, in operation 1111, a UE B 1150 may transmit a SL-UCE message in order to obtain SL capability information of a counterpart UE A 1100 on which direct communication is to be performed. The SL-UCE message may include SL frequency filter information.

In operation 1113, the UE A 1100, which receives the SL-UCE message, may configure SL radio capability information corresponding to SL frequency filter information provided in the SL-UCE message. The SL capability information may include at least one of SL frequency information or SL feature set information. The SL frequency information may include at least one of a list of bands or a band combination, which are supported by the UE A 1100. The SL feature set information may include at least one of a SL SDAP feature, a SL PDCP feature, a SL RLC feature, a SL MAC feature, or a SL PHY feature.

In operation 1115, the UE A 1100 may transmit the SL-UGI message to the UE B 1150.

In the embodiment of FIG. 11, a case where SL unicast communication is provided only through a SL NR RAT interface has been described. In this case, it may be determined that the UEs, which transmit and receive the SL-UCE message and the SL-UCI message, process the capability information for the SL NR RAT.

Assuming a case where the SL unicast communication is provided through the SL NR RAT interface and the SL LTE RAT interface, the SL-UCE message and the SL-UCI message may include SL RAT type information that are supportable by the UEs. Next, a UE operation when SL unicast communication is supported in one or more SL RAT types will be described with reference to FIG. 12.

Figure 12:
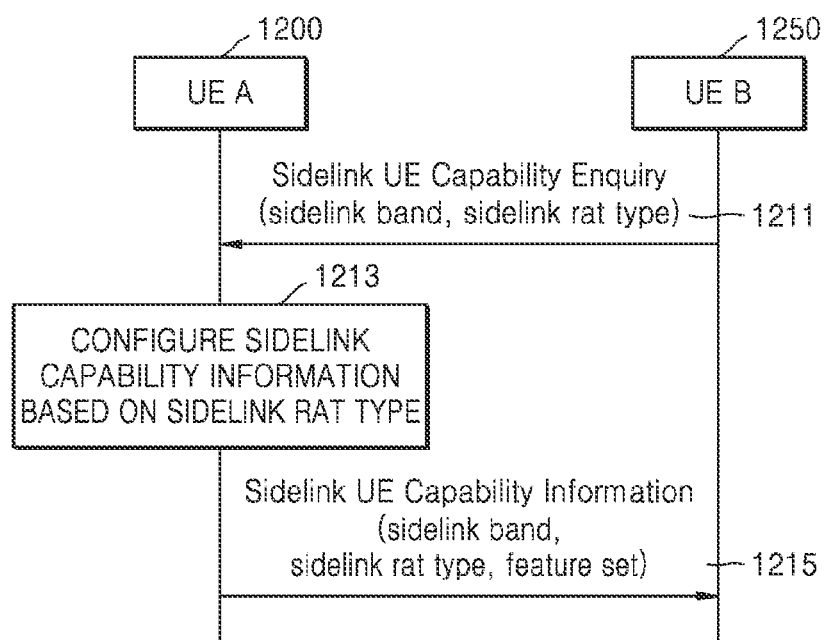
FIG. 12 illustrates a signaling flow between terminals, which processes sidelink radio capability information, according to embodiments of the present disclosure.

FIG. 12 illustrates a signaling flow between UEs, which processes SL capability information, according to an embodiment of the present disclosure.

Referring to FIG. 12, in operation 1211, a UE B 1250 may transmit a SL-UCE message in order to obtain SL radio capability information of a counterpart UE A 1200 on which direct communication is to be performed. The SL-UCE message may include SL frequency filter information. The SL-UCE message may include SL RAT type filter information. The SL RAT type information included in the SL-UCE message may indicate radio capability information of a SL RAT that the counterpart UE A 1200 should include when configuring a SL-UCI message. The SL RAT type may include LTE or NR.

In operation 1213, the UE A 1200, which receives the SL-UCE message, may configure SL radio capability information corresponding to the SL frequency filter information and the SL RAT type information, which are provided in the SL-UCE message. The SL radio capability information may include at least one of SL frequency information, SL RAT type information, or SL feature set information. The SL frequency information may include at least one of a list of bands or a band combination, which are supported by the UE A 1200. Based on the SL RAT type information, the UE A 1200 may configure at least one of capability information capable of supporting a NR SL or capability information capable of supporting a LTE SL. The SL feature set information may include at least one of a SL SDAP feature, a SL PDCP feature, a SL RLC feature, a SL MAC feature, or a SL PHY feature. In operation 1215, the UE A 1200 may transmit the SL-UCI message to the UE B 1250.

The procedure for processing the SL capability information between the UE and the base station, which has been described with reference to FIGS. 8 to 10, and the procedure for processing the SL capability information between the UEs, which has been described with reference to FIGS. 11 and 12, may be performed separately. However, for the procedures for processing SL capability information between the UE and the base station or between the UEs when at least one UE operates within the coverage of the base station, one procedure may be performed and another procedure may be performed in conjunction with the one procedure. For example, when the UE continues to perform SL unicast within the coverage of the base station while performing SL unicast outside the coverage of the base station, the procedures of FIGS. 11 and 12 may be performed, and then, the procedures of FIGS. 8 to 10 may be performed within the coverage of the base station. For example, when the UE continues to perform SL unicast in a RRC connected mode while performing SL unicast in a RRC inactive or RRC idle mode, the procedures of FIGS. 11 and 12 may be performed, and then, the procedures of FIGS. 8 to 10 may be performed within the coverage of the base station. For example, (a) the UE may operate within the coverage of the base station, (b) the UE may operate outside the coverage of the base station, and (c) the UE may operate again within the coverage of the base station. At this time, in the case of (a), the UE may perform the procedures of FIGS. 8 to 10. In the case of (b), the UE may perform the procedures of FIGS. 11 and 12. In the case of (c), the UE may perform the procedures of FIGS. 8 to 10. Hereinafter, a signaling flow between the UEs and the base station performing the procedures of FIGS. 8 to 10 and the procedures of FIGS. 11 and 12 in conjunction with each other will be described with reference to FIGS. 13 to 15.

Figure 13:
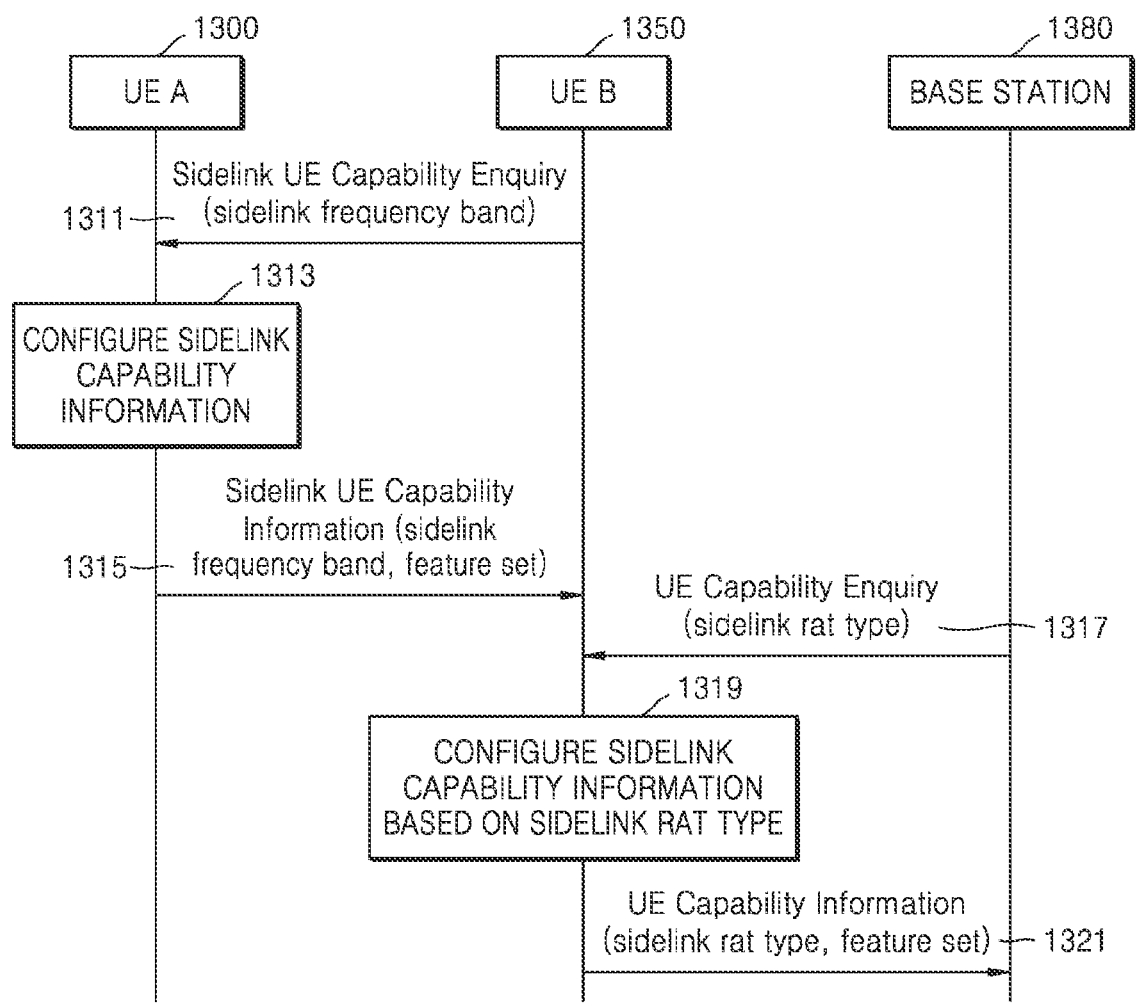
FIG. 13 illustrates a signaling low for processing sidelink capability information, according to an embodiment of the present disclosure.

FIG. 13 illustrates a signaling low for processing SL capability information, according to an embodiment of the present disclosure.

Referring to FIG. 13, in operations 1311 to 1315, a UE A 1300 may perform a SL capability information processing procedure by using the procedure of FIG. 11 or 12 described above in order to perform direct communication with a UE B 1350. Specifically, in operation 1311, the UE A 1300 may receive a SL-UCE message from the UE B 1350, and the SL-UCE message may include information about a SL frequency band. In operation 1313, the UE A 1300 may configure SL capability information based on the SL-UCE message. Also, in operation 1315, the UE A 1300 may transmit a SL-UCI message to the UE B 1350. In this case, the SL-UCI message may include SL frequency information, feature set information, and the like.

In operation 1317, the UE B 1350 may receive a UCE message from a base station 1380 and determine whether the UCE message requests SL capability information. The UCE message may include at least one of SL RAT type filter information or SL frequency band filter information. In operation 1319, the UE B 1350 may determine the request for SL capability information based on the UCE message received from the base station. Specifically, the UE B 1350 may configure the SL capability information by determining the request, based on at least one of a SL frequency or a SL RAT type. The process of configuring the SL capability information in operation 1319 may follow the process of operation 813, 913, or 1015 described above.

In operation 1321, the UE B 1350 may transmit, to the base station 1380, a UCI message including the SL capability information (feature set) configured in operation 1319 based on at least one of the SL frequency or the SL RAT type.

The UCI message that the UE B 1350 transmits to the base station 1380 in operation 1321 may include the SL-UCI message received from the UE A 1300. When the SL-UCI message of the UE A 1300 is included in the UCI message that the UE B 1350 transmits to the base station 1380, information of the UE A 1300 may be included in the UCI message in the form of a container. The information of the UE A 1300 included in the UCI message may include information filtered based on at least one of SL RAT type filter information or SL frequency band filter information of the UCE message received from the base station 1380.

Figure 14:
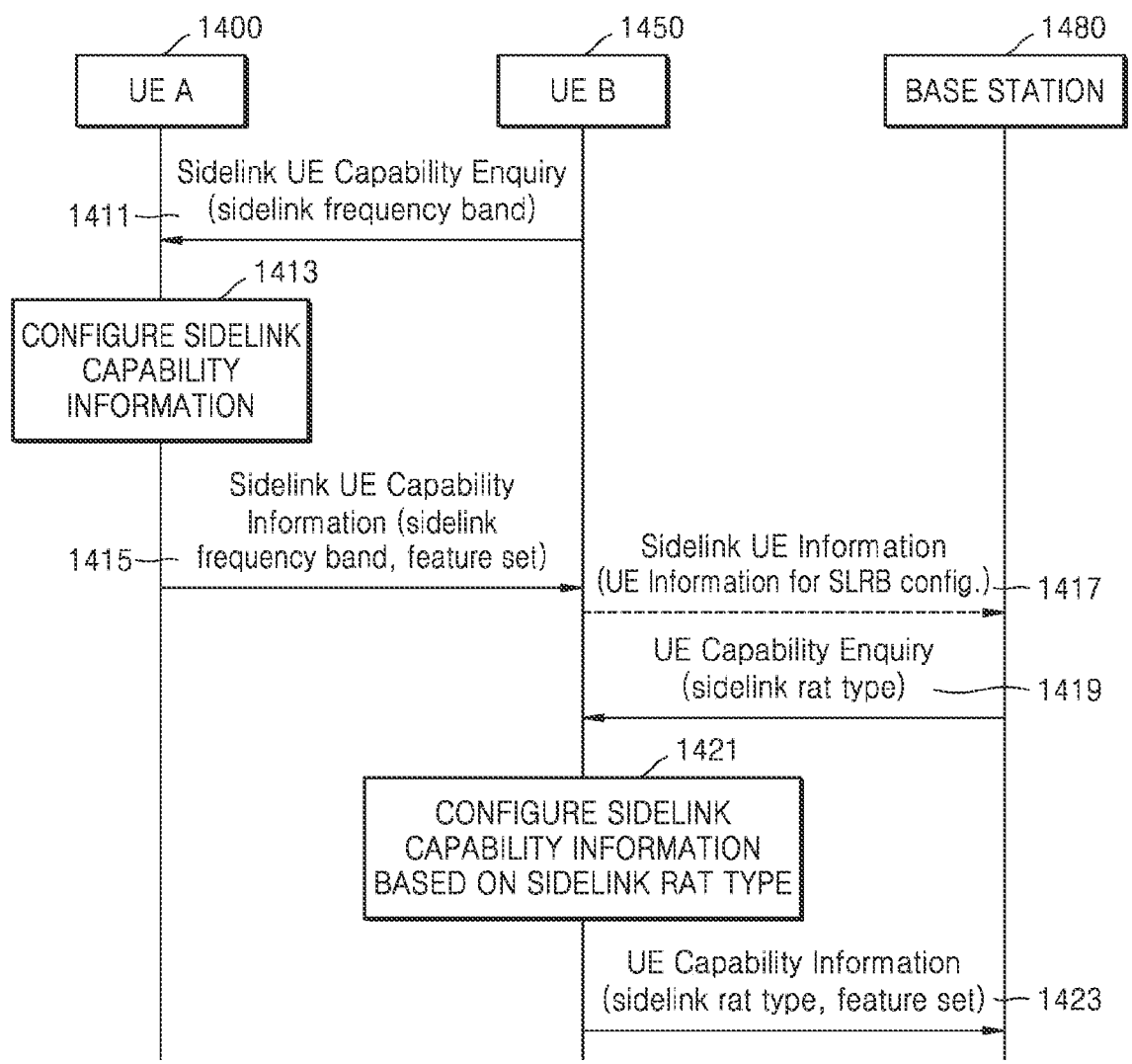
FIG. 14 illustrates a signaling for processing sidelink capability information, according to an embodiment of the present disclosure.

FIG. 14 illustrates a signaling for processing SL capability information, according to an embodiment of the present disclosure.

Referring to FIG. 14, in operations 1411 to 1415, a UE A 1400 may perform a SL capability information processing procedure by using the procedure of FIG. 11 or 12 described above in order to perform direct communication with a UE B 1450. Specifically, in operation 1411, the UE A 1400 may receive a SL-UCE message from the UE B 1450. In operation 1413, the UE A 1400 may configure SL capability information. in operation 1415, the UE A 1400 may transmit a SL-UCI message to the UE B 1450.

In operation 1417, the UE B 1450 may transmit a SidelinkUEInformation message to a base station 1480 in order to obtain SL bearer configuration information from the base station 1480.

In operation 1419, the UE B 1450 may receive a UCE message from the base station 1480 and determine whether the UCE message requests SL radio capability information. The UCE message may include at least one of SL RAT type filter information or SL frequency band filter information. In operation 1421, the UE B 1450 may determine the request for SL capability information based on the received UCE message. Also, the UE B 1450 may configure the SL radio capability information based on at least one of a SL frequency or a SL RAT type. The process, performed by the UE B 1450, of configuring the SL radio capability information in operation 1421 may follow the process of operation 813, 913, or 1015 described above.

In operation 1423, the UE B 1450 may transmit, to the base station 1480, a UCI message including the SL capability information (feature set) configured in operation 1421 based on at least one of the SL frequency or the SL RAT type. The UCI message that the UE B 1450 transmits to the base station 1480 in operation 1423 may include the SL-UCI message received from the UE A 1400. When the SL-UCI message of the UE A 1400 is included in the SL-UCI message received from the UE A 1400, information of the UE A 1400 may be included in the UCI message in the form of a container. The information of the UE A 1400 included in the UCI message may include information filtered based on at least one of SL RAT type filter information or SL frequency band filter information of the UCE message received from the base station 1480.

Figure 15:
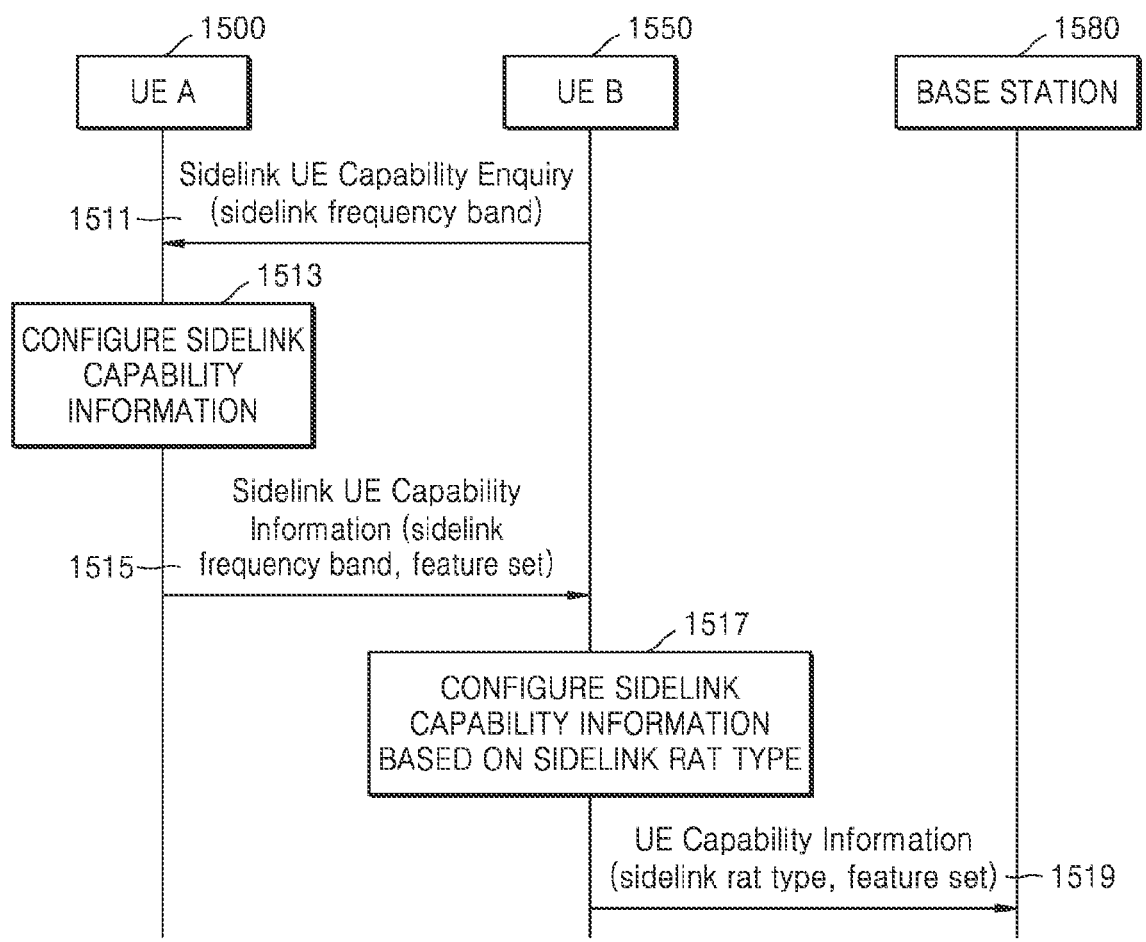
FIG. 15 illustrates a signaling for processing sidelink capability information, according to an embodiment of the present disclosure.

FIG. 15 illustrates a signaling for processing SL capability information, according to an embodiment of the present disclosure.

Referring to FIG. 15, in operations 1511 to 1515, a UE A 1500 may perform a SL radio capability information processing procedure by using the procedure of FIG. 11 or 12 described above in order to perform direct communication with a UE B 1550. Specifically, in operation 1511, the UE A 1500 may receive a SL-UCE message from the UE B 1550. In operation 1513, the UE A 1500 may configure SL capability information. in operation 1515, the UE A 1500 may transmit a SL-UCI message to the UE B 1550.

In operation 1517, the UE B 1550 may determine the need to report SL capability information to a base station 1580. Operation 1517 may be performed when the UE B 1550 has no history of reporting SL capability information to the base station 1580 or there is information to be updated in the SL capability information previously reported to the base station 1580. Also, in operation 1517, the UE B 1550 may configure SL radio capability information to be reported to the base station 1580. As an embodiment, in operation 1517, the UE B 1550 may configure SL capability information based on at least one of the SL frequency or the SL RAT type, which are processed in operations 1511 to 1515. As another embodiment, the process, performed by the UE B 1550, of configuring the SL capability information in operation 1517 may follow the process of operation 813, 913, or 1015.

In operation 1519, the UE B 1550 may transmit, to the base station 1580, a UCI message including the SL radio capability information (feature set) configured in operation above 1517 based on at least one of the SL frequency or the SL RAT type.

The UCI message that the UE B 1550 transmits to the base station 1580 in operation 1519 may include the SL-UCI message received from the UE A 1500. When the SL-UCI message of the UE A 1500 is included in the SL-UCI message of the UE A 1500, information of the UE A 1500 may be included in the UCI message in the form of a container. The information of the UE A 1500 included in the UCI message may include information filtered based on at least one of SL RAT type filter information or SL frequency band filter information of the UCE message received from the base station 1580.

The embodiment of performing the SL radio capability information processing procedure between the base station and the UE after performing the SL radio capability information processing procedure between the UEs has been described with reference to FIGS. 13 to 15, but the SL radio capability information processing procedure between the UEs may be performed before the SL radio capability information processing procedure between the base station and the UE. In this case, after the procedure of FIGS. 8, 9, or 10 is performed, the procedure of FIG. 11 or 12 may be performed.

According to an embodiment of the present disclosure, as a method of reporting a band combination for a SL frequency band capable of simultaneous transmission or simultaneous reception when the UE is able to perform simultaneous transmission or simultaneous reception through SL frequency bands corresponding to one or more heterogeneous RATs (EUTRA or NR), at least one piece of information from among a SL frequency band list of each RAT, a band combination of a SL frequency of each RAT that is usable with a Uu frequency, the number of SL frequency bands of each RAT that may be simultaneously transmitted, the number of SL frequency bands of each RAT that may be simultaneously received, an indicator indicating that simultaneous transmission is possible in a SL frequency band of each RAT, and an indicator indicating that simultaneous reception is possible in a SL frequency band of each RAT may be included in a report. The reported information may be included in a UE capability message (SL-UCE or SL-UCI) transmitted through a SL or a UE capability message (UCI) transmitted through a Uu link.

For example, the UE may report EUTRA SL frequency band B and EUTRA SL frequency band C, which are capable of transmission for Uu frequency band A, and NR SL frequency band B and NR SL frequency band D, which are capable of transmission for Uu frequency band A. Also, when the UE is capable of simultaneous transmission by using the EUTRA SL frequency band and the NR SL frequency band, the UE may report information about the SL frequency band that may be used simultaneously. For example, when EUTRA SL frequency band B, EUTRA SL frequency band C, and NR SL frequency band B, or EUTRA SL frequency band B, EUTRA SL frequency band C, and NR SL frequency band D are usable for simultaneous transmission, the UE may report that the number of simultaneous transmittable EUTRA SL frequency bands (EUTRA SL frequency band B and EUTRA SL frequency band C) of the EUTRA SL is two and the number of simultaneous transmittable NR SL frequency bands (NR SL frequency band B or NR SL frequency band D) of the NR SL is one. For example, the UE may report EUTRA SL frequency band B and EUTRA SL frequency band C, which are capable of reception for Uu frequency band A, and NR SL frequency band B and NR SL frequency band D, which are capable of reception for Uu frequency band A. Also, when the UE is capable of simultaneous reception by using the EUTRA SL frequency band and the NR SL frequency band, the UE may report information about the SL frequency band that may be used simultaneously. For example, when EUTRA SL frequency band B, EUTRA SL frequency band C, and NR SL frequency band B, or EUTRA SL frequency band B, EUTRA SL frequency band C, and NR SL frequency band D are usable for simultaneous reception, the UE may report that the number of simultaneous receivable EUTRA SL frequency bands (EUTRA SL frequency band B and EUTRA SL frequency band C) of the EUTRA SL is two and the number of simultaneous receivable NR SL frequency bands (NR SL frequency band B or NR SL frequency band D) of the NR SL is one.

Also, when EUTRA SL frequency band B, EUTRA SL frequency band C, NR SL frequency band B, and NR SL frequency band D are usable for simultaneous transmission or simultaneous reception, the UE may report an indicator indicating that simultaneous transmission or simultaneous reception is possible in the EUTRA SL frequency band and the NR SL frequency band. As another example, when the UE may report EUTRA SL frequency band B and EUTRA SL frequency band C capable of reception for Uu frequency band A and NR SL frequency band B and NR SL frequency band D capable of reception for Uu frequency band A and may use EUTRA SL frequency band B, EUTRA SL frequency band C, NR SL frequency band B, and NR SL frequency band D for simultaneous reception, the UE may report an indicator indicating that simultaneous reception is possible in the EUTRA SL frequency band and the NR SL frequency band. For example, when the UE is capable of simultaneous transmission for a part of the EUTRA SL frequency band or a part of the NR SL frequency band, the UE may report at least one of an indicator indicating that simultaneous transmission is possible, a list of simultaneously transmittable frequency bands, or the number of simultaneously transmittable frequency bands. For example, when the UE is capable of simultaneous reception for a part of the EUTRA SL frequency band or a part of the NR SL frequency band, the UE may report at least one of an indicator indicating that simultaneous reception is possible, a list of simultaneously receivable frequency bands, or the number of simultaneously receivable frequency bands.

The methods according to the embodiments of the present disclosure, which are described in the claims or the detailed description, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in random access memory (RAM), non-volatile memory including flash memory, read-only memory (ROM), electrically erasable programmable read-only memory (EEPROM), magnetic disc storage devices, compact disc-ROM (CD-ROM), digital versatile discs (DVDs), other types of optical storage devices, or magnetic cassette. Alternatively, one or more programs may be stored in a memory provided by a combination of all or part of these devices. Also, each memory may include a plurality of configured memories.

Also, the programs may be stored in an attachable storage device that is accessible through a communication network such as Internet, Intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiment of the present disclosure.

In specific embodiments of the present disclosure, the elements included in the present disclosure have been expressed in the singular or plural form according to the suggested specific embodiments of the present disclosure. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, although specific embodiments have been described in the detailed description of the present disclosure, various modifications may be made thereto without departing from the scope of the present disclosure. Therefore, the scope of the present disclosure should not be limited to the described embodiments and should be defined by the following claims and the equivalents thereto.

The invention claimed is:

1. A user equipment (UE) in a wireless communication system, the UE comprising:
a transceiver; and
at least one processor connected to the transceiver, wherein the at least one processor is configured to:
receive, from a base station, radio access technology (RAT) type information and frequency information; and
transmit capability information of the UE to the base station based on the RAT type information and the frequency information,
wherein the RAT type information is associated with at least one of new radio (NR), evolved universal terrestrial radio access (EUTRA)-NR, or EUTRA,
wherein the frequency information is associated with a Uu frequency or a sidelink frequency,
wherein the capability information of the UE is associated with sidelink radio capability information, and
wherein the sidelink radio capability information includes at least one of a list of frequency bands supporting a sidelink or a frequency band combination supporting the sidelink.

2. The UE of claim 1, wherein
the sidelink radio capability information includes at least one of a radio link control (RLC) feature or a medium access control (MAC) feature.

3. The UE of claim 1, wherein the capability information of the UE includes information about a list of frequency bands or a frequency band combination corresponding to at least one of EUTRA or NR.

4. A first user equipment (UE) in a wireless communication system, the first UE comprising:
a transceiver; and
at least one processor connected to the transceiver, wherein the at least one processor is configured to:
transmit, to a second UE, a UECapabilityEnquiry message including sidelink frequency filter information; and
receive capability information of the second UE which is based on the sidelink frequency filter information,
wherein the capability information of the second UE includes sidelink frequency information corresponding to the sidelink frequency filter information, and
wherein the sidelink frequency information includes at least one of a list of frequency bands or a frequency band combination supported by the second UE.

5. The first UE of claim 4, wherein the capability information of the second UE is associated with unicast sidelink communication.

6. The first UE of claim 4, wherein sidelink UE capability information is configured based on the capability information of the second UE.

7. The first UE of claim 6, wherein the at least one processor is configured to transmit the sidelink UE capability information to a base station.

8. The first UE of claim 6, wherein the sidelink UE capability information includes the capability information of the second UE.

9. An operating method of a first user equipment (UE) in a wireless communication system, the operating method comprising:
transmitting, to a second UE, a UECapability Enquiry message including sidelink frequency filter information; and
receiving capability information of the second UE which is based on the sidelink frequency filter information,
wherein the capability information of the second UE includes sidelink frequency information corresponding to the sidelink frequency filter information, and
wherein the sidelink frequency information includes at least one of a list of frequency bands or a frequency band combination supported by the second UE.

10. A base station in a wireless communication system, the base station comprising:
a transceiver; and
at least one processor connected to the transceiver, wherein the at least one processor is configured to:
transmit, to a user equipment (UE), radio access technology (RAT) type information and frequency information; and
receive, from the UE, capability information of the UE generated based on the RAT type information and the frequency information,
wherein the RAT type information is associated with at least one of new radio (NR), evolved universal terrestrial radio access (EUTRA)-NR, or EUTRA,
wherein the frequency information is associated with a Uu frequency or a sidelink frequency,
wherein the capability information of the UE is associated with sidelink radio capability information, and
wherein the sidelink radio capability information includes at least one of a list of frequency bands supporting a sidelink or a frequency band combination supporting the sidelink.

11. The base station of claim 10, wherein
the sidelink radio capability information includes at least one of a radio link control (RLC) feature, or a medium access control (MAC) feature.

12. The base station of claim 10, wherein the capability information of the UE includes information about a list of frequency bands or a frequency band combination corresponding to at least one of EUTRA or NR.

* * * * *